(12) United States Patent
Ridley et al.

(10) Patent No.: US 11,686,024 B2
(45) Date of Patent: *Jun. 27, 2023

(54) SYSTEM AND METHOD FOR THERMALLY ADAPTIVE MATERIALS

(71) Applicant: Other Lab, LLC, San Francisco, CA (US)

(72) Inventors: Brent Ridley, Huntington Beach, CA (US); Saul Griffith, San Francisco, CA (US); Shara Maikranz, San Francisco, CA (US); Jean Chang, San Francisco, CA (US); Pete Lynn, Oakland, CA (US)

(73) Assignee: OTHER LAB, LLC, San Francisco, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/036,210

(22) Filed: Sep. 29, 2020

(65) Prior Publication Data

US 2021/0025091 A1    Jan. 28, 2021

Related U.S. Application Data

(63) Continuation of application No. 15/160,439, filed on May 20, 2016, now Pat. No. 10,793,981.

(Continued)

(51) Int. Cl.
*D04B 21/00* (2006.01)
*B32B 27/02* (2006.01)
(Continued)

(52) U.S. Cl.
CPC .......... *D04B 21/00* (2013.01); *A41D 31/065* (2019.02); *B32B 3/266* (2013.01); *B32B 5/022* (2013.01);
(Continued)

(58) Field of Classification Search
CPC .... D04H 1/42; D04B 21/00; D10B 2401/046; A41D 31/065; B32B 5/024; B32B 5/04;
(Continued)

(56) References Cited

U.S. PATENT DOCUMENTS 2,387,320 A    10/1945  Foster
3,429,758 A     2/1969  Young
(Continued)

FOREIGN PATENT DOCUMENTS

CN    101956271 A    1/2011
CN    104769834 A    7/2015
(Continued)

OTHER PUBLICATIONS

Abel et al., "Hierarchical architecture of active knits," Smart Materials and Structures 22(12):125001, Nov. 1, 2013, 17 pages.
(Continued)

*Primary Examiner* — Jeremy R Pierce
(74) *Attorney, Agent, or Firm* — Davis Wright Tremaine LLP

(57) ABSTRACT

An adaptive textile that includes a plurality of a first fiber having a first expansion coefficient and a plurality of a second fiber having a second expansion coefficient. There is a difference between the expansion coefficient of the first fiber and the expansion coefficient of the second fiber; at least one of the first or second fibers is a twisted coil actuator; and linear displacement of the twisted coil actuator causes the adaptive textile to bend.

20 Claims, 19 Drawing Sheets

Related U.S. Application Data

(60) Provisional application No. 62/257,126, filed on Nov. 18, 2015, provisional application No. 62/164,740, filed on May 21, 2015.

(51) Int. Cl.

| | | |
|---|---|---|
| *B32B 5/02* | (2006.01) | |
| *B32B 5/12* | (2006.01) | |
| *B32B 15/04* | (2006.01) | |
| *B32B 15/02* | (2006.01) | |
| *B32B 5/04* | (2006.01) | |
| *B32B 15/14* | (2006.01) | |
| *B32B 5/26* | (2006.01) | |
| *B32B 5/06* | (2006.01) | |
| *B32B 15/08* | (2006.01) | |
| *B32B 3/26* | (2006.01) | |
| *B32B 7/12* | (2006.01) | |
| *B32B 27/08* | (2006.01) | |
| *B32B 7/05* | (2019.01) | |
| *A41D 31/06* | (2019.01) | |

(52) U.S. Cl.
CPC .............. *B32B 5/024* (2013.01); *B32B 5/026* (2013.01); *B32B 5/04* (2013.01); *B32B 5/06* (2013.01); *B32B 5/12* (2013.01); *B32B 5/26* (2013.01); *B32B 7/05* (2019.01); *B32B 7/12* (2013.01); *B32B 15/02* (2013.01); *B32B 15/04* (2013.01); *B32B 15/08* (2013.01); *B32B 15/14* (2013.01); *B32B 27/02* (2013.01); *B32B 27/08* (2013.01); *A41D 2500/00* (2013.01); *B32B 2250/02* (2013.01); *B32B 2250/20* (2013.01); *B32B 2250/24* (2013.01); *B32B 2262/02* (2013.01); *B32B 2307/30* (2013.01); *B32B 2307/304* (2013.01); *B32B 2307/416* (2013.01); *B32B 2307/51* (2013.01); *B32B 2307/516* (2013.01); *B32B 2307/518* (2013.01); *B32B 2307/54* (2013.01); *B32B 2307/546* (2013.01); *B32B 2307/554* (2013.01); *B32B 2307/56* (2013.01); *B32B 2307/58* (2013.01); *B32B 2307/706* (2013.01); *B32B 2307/724* (2013.01); *B32B 2307/7265* (2013.01); *B32B 2307/732* (2013.01); *B32B 2437/00* (2013.01); *B32B 2535/00* (2013.01); *B32B 2601/00* (2013.01)

(58) Field of Classification Search
CPC .. B32B 5/06; B32B 5/26; B32B 5/026; B32B 7/05; B32B 7/08; B32B 3/266; B32B 15/02; B32B 15/04; B32B 15/08; B32B 15/14; B32B 27/02; B32B 27/08
See application file for complete search history.

(56) References Cited

U.S. PATENT DOCUMENTS

| | | |
|---|---|---|
| 3,451,305 A | 6/1969 | Johnson |
| 3,600,259 A | 8/1971 | Smith |
| 5,127,783 A | 7/1992 | Moghe et al. |
| 5,150,476 A | 9/1992 | Statham et al. |
| 5,212,258 A | 5/1993 | Irwin |
| 5,628,172 A | 5/1997 | Kolmes et al. |
| 5,834,093 A | 11/1998 | Challis et al. |
| 6,312,784 B2 | 11/2001 | Russell et al. |
| 6,458,231 B1 | 10/2002 | Wapner et al. |
| 6,767,850 B1 | 7/2004 | Tebbe |
| 6,770,579 B1 | 8/2004 | Dawson et al. |
| 7,291,389 B1 | 11/2007 | Bitler et al. |
| 7,754,626 B2 | 7/2010 | Baron et al. |
| 7,976,924 B2 | 7/2011 | Stanford, Jr. et al. |
| 8,187,984 B2 | 5/2012 | Rock |
| 8,192,824 B2 | 6/2012 | Rock et al. |
| 8,349,438 B2 | 1/2013 | Laib et al. |
| 8,389,100 B2 | 3/2013 | Rock et al. |
| 9,163,334 B1 | 10/2015 | Fossey et al. |
| 9,903,350 B2 | 2/2018 | Li et al. |
| 10,793,981 B2 * | 10/2020 | Ridley ................. B32B 5/026 |
| 2001/0008821 A1 | 7/2001 | Russell et al. |
| 2002/0190451 A1 | 12/2002 | Sancaktar et al. |
| 2003/0007774 A1 | 1/2003 | Christopher et al. |
| 2004/0062910 A1 | 4/2004 | Morrison |
| 2004/0266293 A1 | 12/2004 | Thiriot |
| 2005/0204449 A1 | 9/2005 | Baron et al. |
| 2005/0251900 A1 | 11/2005 | Harlacker |
| 2006/0277950 A1 | 12/2006 | Rock |
| 2007/0184238 A1 | 8/2007 | Hockaday et al. |
| 2009/0176054 A1 | 7/2009 | Laib et al. |
| 2011/0052861 A1 | 3/2011 | Rock |
| 2013/0078415 A1 | 3/2013 | Rock |
| 2013/0247536 A1 | 9/2013 | Erlendsson et al. |
| 2014/0004295 A1 | 1/2014 | Kiederle |
| 2014/0004332 A1 | 1/2014 | Kanayama |
| 2014/0053311 A1 | 2/2014 | Nordstrom et al. |
| 2014/0053312 A1 | 2/2014 | Nordstrom et al. |
| 2014/0304896 A1 | 10/2014 | Nordstrom et al. |
| 2015/0152852 A1 | 6/2015 | Li et al. |
| 2016/0017870 A1 | 1/2016 | Mather |
| 2016/0340814 A1 | 11/2016 | Ridley et al. |

FOREIGN PATENT DOCUMENTS

| | | |
|---|---|---|
| CN | 105816301 A | 8/2016 |
| EP | 0900138 B1 | 1/2002 |
| JP | H0711535 A | 1/1995 |
| JP | 2000234231 A | 8/2000 |
| JP | 2004197259 A | 7/2004 |
| JP | 2008517183 A | 5/2008 |
| JP | 2011510180 A | 3/2011 |
| JP | 2012087449 A | 5/2012 |
| JP | 2015533521 A | 11/2015 |
| KR | 20150038475 A | 4/2015 |
| RU | 2527710 C1 | 9/2014 |
| SU | 251758 | 11/1970 |
| WO | 8603816 A1 | 7/1986 |
| WO | 1999005926 A1 | 2/1999 |
| WO | 2006044210 A1 | 4/2006 |
| WO | 2009085384 A1 | 7/2009 |
| WO | 2012086584 A1 | 6/2012 |
| WO | 2013192531 A1 | 12/2013 |
| WO | 2014022667 A2 | 2/2014 |
| WO | 2014138049 A2 | 9/2014 |
| WO | 2016064220 A1 | 4/2016 |
| WO | 2016187547 A1 | 11/2016 |
| WO | 2016202813 A1 | 12/2016 |
| WO | 2017058339 A2 | 4/2017 |
| WO | 2017096044 A1 | 6/2017 |
| WO | 2017165435 A3 | 12/2017 |

OTHER PUBLICATIONS

Abel, "Active Knit Actuation Architectures," Doctoral dissertation, University of Michigan, Mar. 2014, 161 pages.

Arghyros et al., "Mechanics of Texturing Thermoplastic Yarns. Part VIII: An Experimental Study of Heat Setting," Textile Research Journal 52(5):295-312, May 1982.

Beresford et al., "The Effect of Tension and Annealing on the X-ray Diffraction Pattern of Drawn 6.6 Nylon," Polymer 5:247-256, Jan. 1, 1964.

Buckley et al., "19—Heat-Setting of Drawn Polymeric Fibres: Anomalous Twist Recovery," The Journal of the Textile Institute 76(4):264-274, Jul. 1, 1985.

Buckley et al., "High-temperature viscoelasticity and heat-setting of poly(ethylene terephthalate)," Polymer 28(1):69-85, first disclosed Apr. 1982, print publication Jan. 1, 1987.

Chen et al., "Electromechanical Actuator Ribbons Driven by Electrically Conducting Spring-Like Fibers," Advanced Materials 27(34):4982-4988, Sep. 1, 2015.

(56) References Cited

OTHER PUBLICATIONS

Chen et al., "Hierarchically arranged helical fibre actuators driven by solvents and vapours," Nature Nanotechnology 10(12):1077-1083, plus Supplementary Notes, published online Sep. 14, 2015, print publication Dec. 2015, 50 pages.
Cherubini et al., "Experimental characterization of thermally-activated artificial muscles based on coiled nylon fishing lines," AIP Advances 5(6):067158, Jun. 2015, 12 pages.
DeCristofano et al., "Temperature-adaptive Insulation Based on Multicomponent Fibers of Various Cross-sections," MRS Proceedings 1312:137-142, Jan. 2011.
Extended European Search Report for Application No. 18785006.0 dated Nov. 19, 2020, 8 pages.
Fossey et al., "Variable Loft Thermal Insulation for Temperature Adaptive Clothing," Solutions and Opportunities for the Safety and Protective Fabrics Industry, 4th International Conference on Safety and Protective Fabrics, Oct. 26, 2004, 18 pages.
Gupta et al., "Structure-Property Relationship in Heat-Set Poly(ethylene Terephthalate) Fibers. I. Structure and Morphology," Journal of Applied Polymer Science 29(10):3115-3129, Oct. 1984.
Gupta et al., "Structure-Property Relationship in Heat-Set Poly(ethylene Terephthalate) Fibers. II. Thermal Behavior and Morphology," Journal of Applied Polymer Science 29(12):3727-3739, Dec. 1984.
Gipta et al., "Structure-Property Relationship in Heat-Set Poly(ethylene Terephthalate) Fibers. III. Stress-Relaxation Behavior," Journal of Applied Polymer Science 29(12):4203-4218, Dec. 1984.
Gupta et al., "Structure-Property Relationship in Heat-Set Poly(ethylene Terephthalate) Fibers. IV. Recovery Behavior," Journal of Applied Polymer Science 29(12):4219-4235, Dec. 1984.
Gupta et al., "The Effect of Heat Setting on the Structure and Mechanical Properties of Poly(ethylene Terephthalate) Fiber. I. Structural Changes," Journal of Applied Polymer Science 26(6):1865-1876, Jun. 1981.
Gupta et al., "The Effect of Heat Setting on the Structure and Mechanical Properties of Poly(ethylene Terephthalate) Fiber. II. The Elastic Modulus and Its Dependence on Structure," Journal of Applied Polymer Science 26(6):1877-1884, Jun. 1981.
Gupta et al., "The Effect of Heat Setting on the Structure and Mechanical Properties of Poly(ethylene Terephthalate) Fiber. III. Anelastic Properties and Their Dependence on Structure," Journal of Applied Polymer Science 26(6):1885-1895, Jun. 1981.
Gupta et al., "The Effect of Heat Setting on the Structure and Mechanical Properties of Poly(ethylene Terephthalate) Fiber. IV. Tensile Properties Other Than Modulus and Their Dependence on Structure," Journal of Applied Polymer Science 26(6):1897-1905, Jun. 1981.
Haines et al., "Artificial Muscles from Fishing Line and Sewing Thread," Science 343(6173):868-872, and Supplementary Materials, Feb. 21, 2014, 41 pages.
Hearle et al., "32—The Snarling of Highly Twisted Monofilaments. Part I: The Load-Elongation Behavior with Normal Snarling," The Journal of the Textile Institute 63(9):477-489, Sep. 1972.
Hearle et al., "33—The Snarling of Highly Twisted Monofilaments. Part II: Cylindrical Snarling," The Journal of the Textile Institute 63(9):490-501, Sep. 1972.
Hiraoka et al., "Power-efficient low-temperature woven coiled fibre actuator for wearable applications," Scientific Reports 6:36358, plus Supplementary Information, Nov. 4, 2016, 16 pages.
Hsu et al., "A dual-mode textile for human body radiative heating and cooling," Science Advances 3(11):e1700895, Nov. 10, 2017, 9 pages.
Hsu et al., "Personal Thermal Management by Metallic Nanowire-Coated Textile," Nano Letters 15(1):365-71, online publication Nov. 30, 2014, print publication Dec. 3, 2014.
Hsu et al., "Radiative human body cooling by nanoporous polyethylene textile," Science 353(6303):1019-1023, plus Supplementary Material, Sep. 2, 2016, 25 pages.

International Search Report and Written Opinion dated Aug. 30, 2018, International Patent Application No. PCT/US2018/026941, filed Apr. 10, 2018.
International Search Report and Written Opinion dated Jun. 26, 2019, Patent Application No. PCT/US2019/020756, filed Mar. 5, 2019, 7 pages.
International Search Report and Written Opinion dated Oct. 6, 2016, International Patent Application No. PCT/US2016/033545, filed May 20, 2016.
Kianzad et al., "Nylon coil actuator operating temperature range and stiffness," SPIE 9430, Electroactive Polymer Actuators and Devices (EAPAD) 2015, Apr. 29, 2015, 6 pages.
Kianzad, "A Treatise on Highly Twisted Artificial Muscle: Thermally Driven Shape Memory Alloy and Coiled Nylon Actuators," Master's Thesis, University of British Columbia, Aug. 2015, 98 pages.
Kim et al., "Bio-inspired, Moisture-Powered Hybrid Carbon Nanotube Yarn Muscles," Scientific Reports 6:23016, Mar. 14, 2016, 7 pages.
Kim et al., "Dynamic Extension-Contraction Motion in Supramolecular Springs," Journal of the American Chemical Society 129(36):10994-10995, Sep. 12, 2007.
Kunugi et al., "Mechanical properties and superstructure of high-modulus and high-strength nylon-6 fibre prepared by the zone-annealing method," Polymer 23(8):1199-1203, Jul. 1, 1982.
Lee et al., "High performance electrochemical and electrothermal artificial muscles from twist-spun carbon nanotube yarn," Nano Convergence 2(1):8, Dec. 1, 2015, nine pages.
Maziz et al., "Knitting and weaving artificial muscles," Science Advances 3(1):e1600327, Jan. 25, 2017.
Melvinsson, "Textile Actuator Fibres: Investigation in materials and methods for coiled polymer fibre muscles," Master's Thesis, The Swedish School of Textiles, University of Borås, Jun. 8, 2015, 60 pages.
Moretti et al., "Experimental characterization of a new class of polymeric-wire coiled transducers," Behavior and Mechanics of Multifunctional Materials and Composites 2015 9432:94320P, Apr. 1, 2015, 9 pages.
Murthy et al., "Effect of annealing on the structure and morphology of nylon 6 fibers," Journal of Macromolecular Science, Part B: Physics 26(4):427-446, Dec. 1, 1987.
Neukirch et al., "Writhing instabilities of twisted rods: from infinite to finite length," Journal of the Mechanics and Physics of Solids 50(6):1175-1191, Jun. 1, 2002.
Ogulata, "Air Permeability of Woven Fabrics," Journal of Textile and Apparel, Technology and Management 5(2):1-10, Jan. 2006.
Park et al., "Structure changes caused by strain annealing of nylon 6 fibers," Journal of Macromolecular Science, Part B: Physics 15(2):229-256, May 1, 1978.
Prevorsek et al., "Effect of Temperature and Draw Ratio on Force-Extension Properties of Twisted Fibers," Textile Research Journal 35(7):581-587, Jul. 1965.
Raviv et al., "Active Printed Materials for Complex Self-Evolving Deformations," Scientific Reports 4:7422, Dec. 18, 2014, 8 pages.
Sharafi et al., "A multiscale approach for modeling actuation response of polymeric artificial muscles," Soft Matter 11(19):3833-3843, Mar. 30, 2015.
Statton, "High-Temperature Annealing of Drawn Nylon 66 Fibers," Journal of Polymer Science Part B: Polymer Physics 10(8):1587-1592, Aug. 1, 1972.
Stoffberg et al., "The Effect of Fabric Structural Parameters and Fiber Type on the Comfort-related Properties of Commercial Apparel Fabrics," Journal of Natural Fibers, Oct. 13, 2015, 15 pages.
Suzuki et al., "Application of a high-tension annealing method to nylon 66 fibres," Polymer 39(6-7):1351-1355, Jan. 1, 1998.
Timoshenko, "Analysis of Bi-Metal Thermostats," Journal of the Optical Society of America 11(3):233-255, Sep. 1, 1925.
Tsujimoto et al., "Changes in Fine Structure of Nylon 6 Gut Yarns in Twisting, Annealing and Untwisting Processes," Journal of the Textile Machinery Society of Japan 25(4):87-92, Dec. 1979; first disclosed in Journal of the Textile Machinery Society of Japan 31(12):T171-5, Dec. 25, 1978.
Tugrul, "Air Permeability of Woven Fabrics," JTAM, 2006, 10 pages.

(56) References Cited

OTHER PUBLICATIONS

Van Der Heijden et al., "Helical and Localised Buckling in Twisted Rods: A Unified Analysis of the Symmetric Case," Nonlinear Dynamics 21(1):71-99, Jan. 1, 2000.
Yang et al., "A top-down multi-scale modeling for actuation response of polymeric artificial muscles," Journal of the Mechanics and Physics of Solids 92:237-259, online publication Apr. 6, 2016, print publication Jul. 2016.
Zhang et al., "Multiscale deformations lead to high toughness and circularly polarized emission in helical nacre-like fibres," Nature Communications 7:10701, Feb. 24, 2016, 28 pages.
Israel Notice of Deficiencies for Patent Application 269860 dated Jul. 25, 2022, 5 pages.
Japan Final Rejection of Application No. 2019-563328 dated Jul. 6, 2022, 2 pages.
China Search Report for Application No. 201880056518.3 dated Jul. 4, 2022, 4 pages.
European Patent Office Communication Under Rule 71(3) EPC, Application No. 18 783 814.9 dated Aug. 11, 2022, 44 pages.

\* cited by examiner

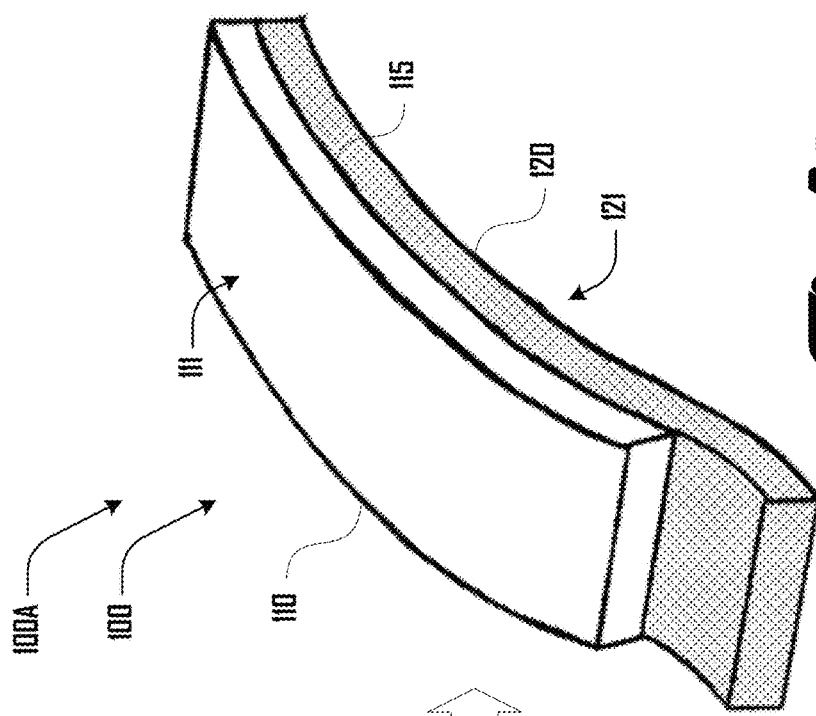
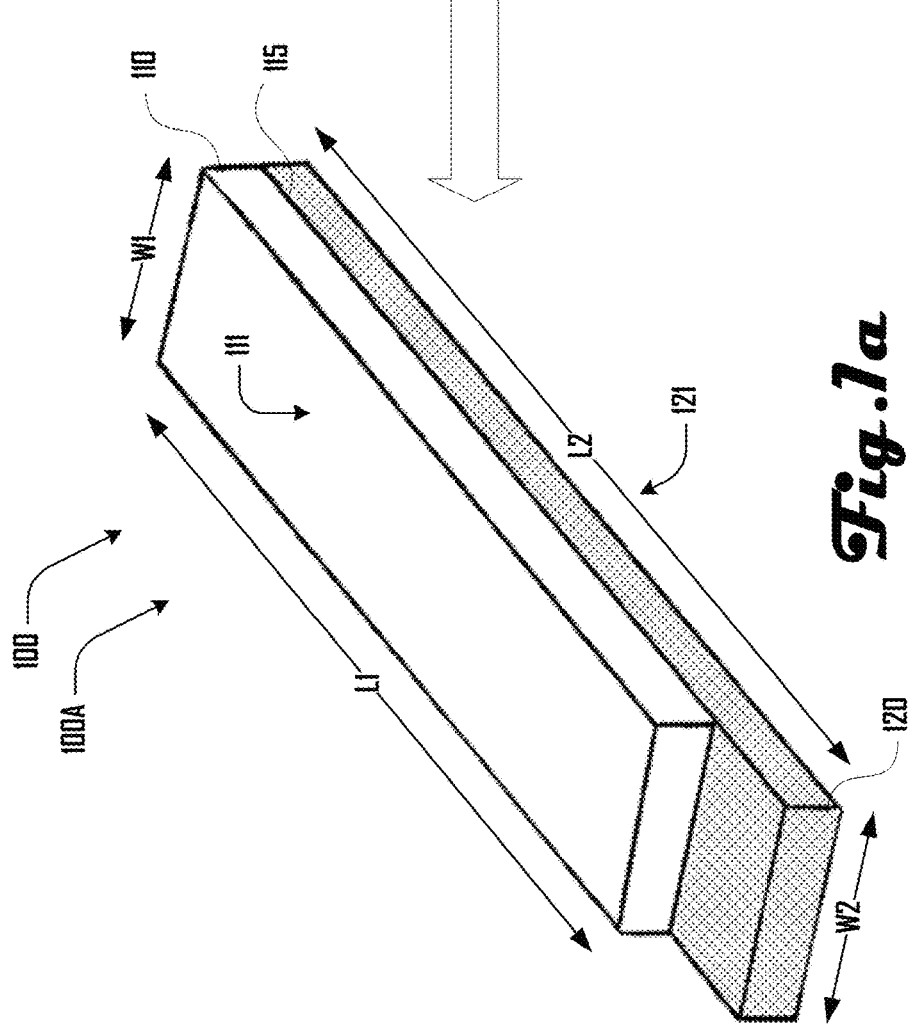

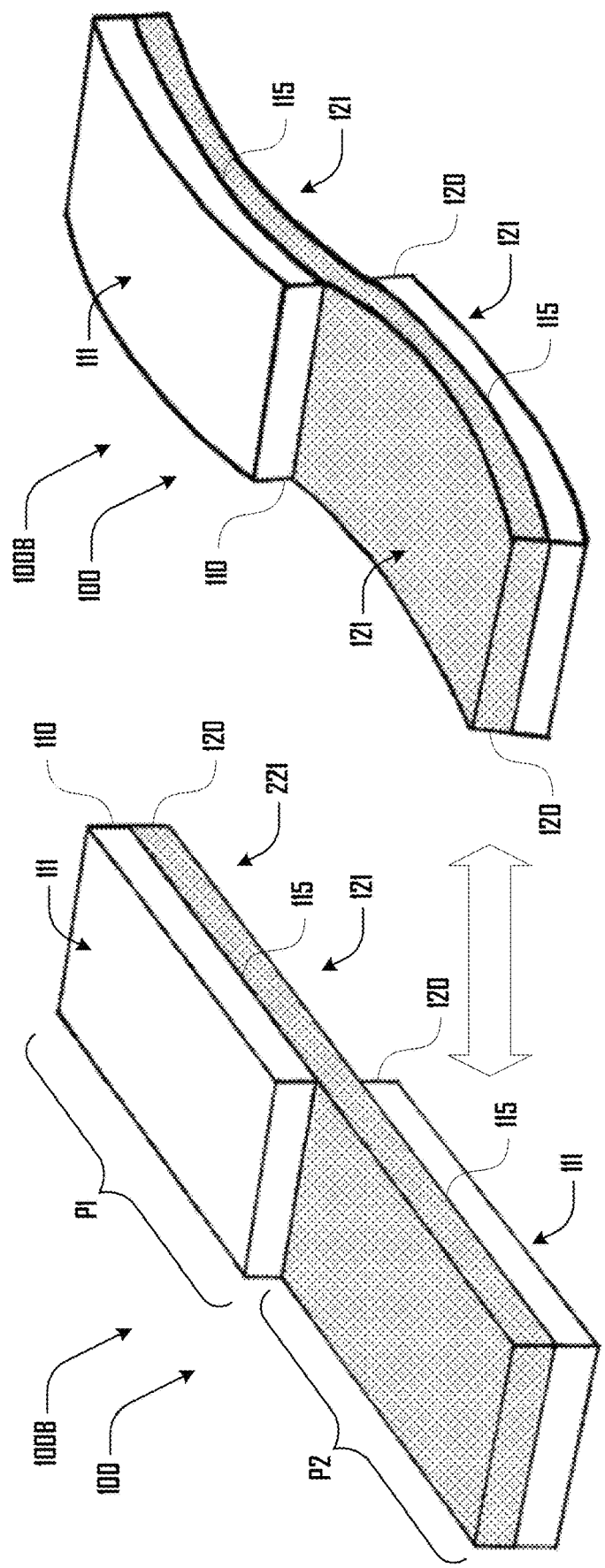

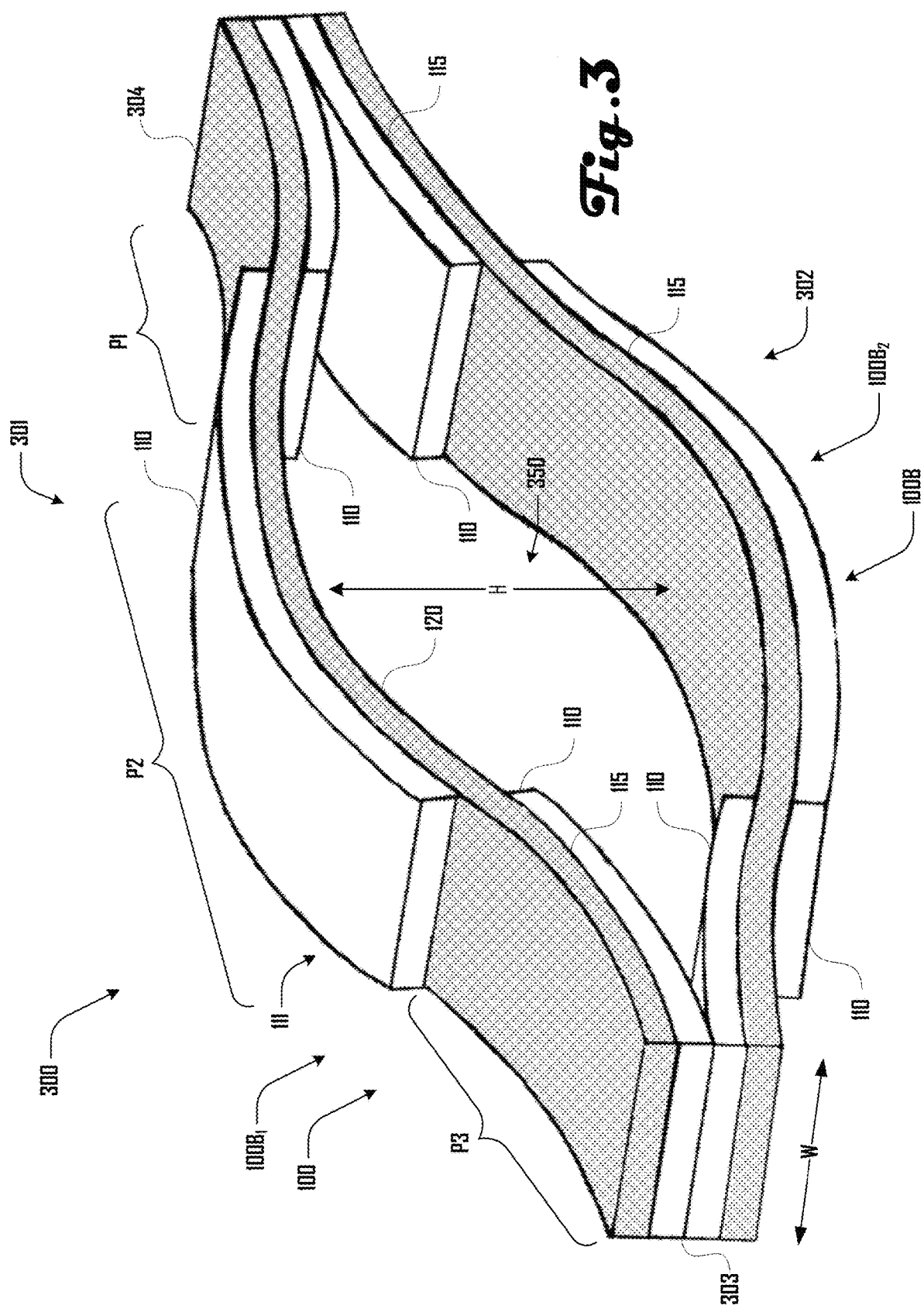

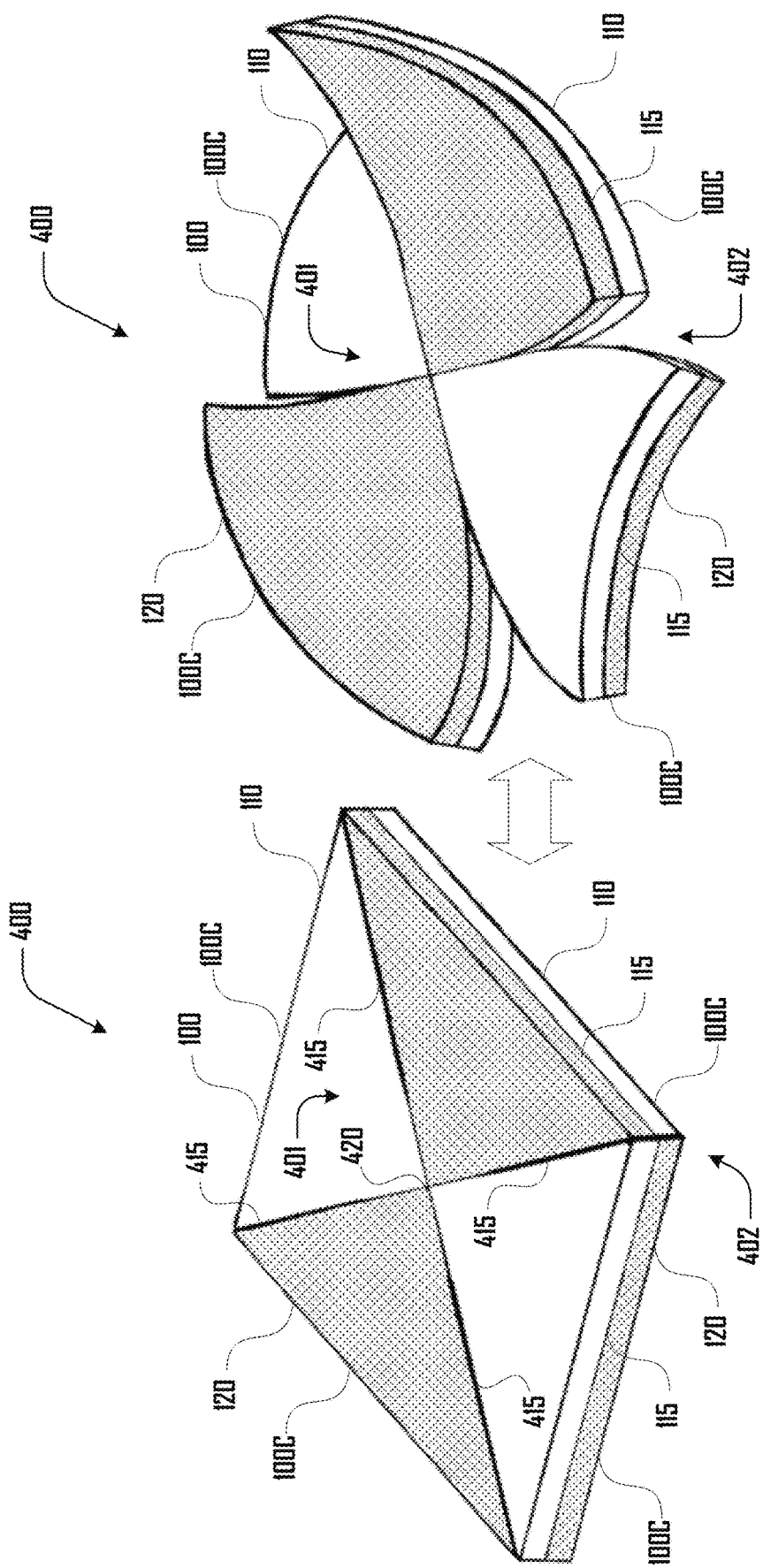

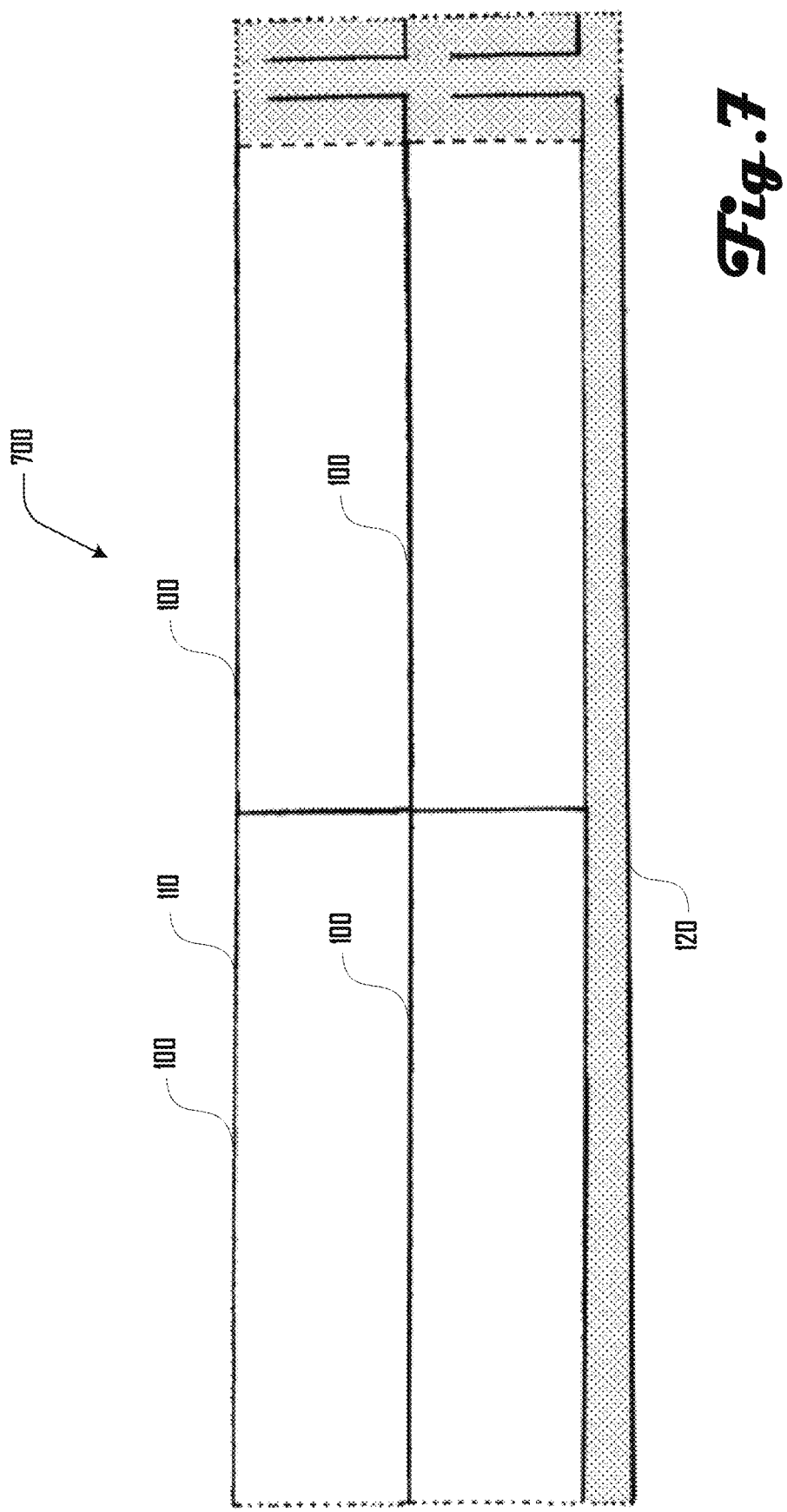

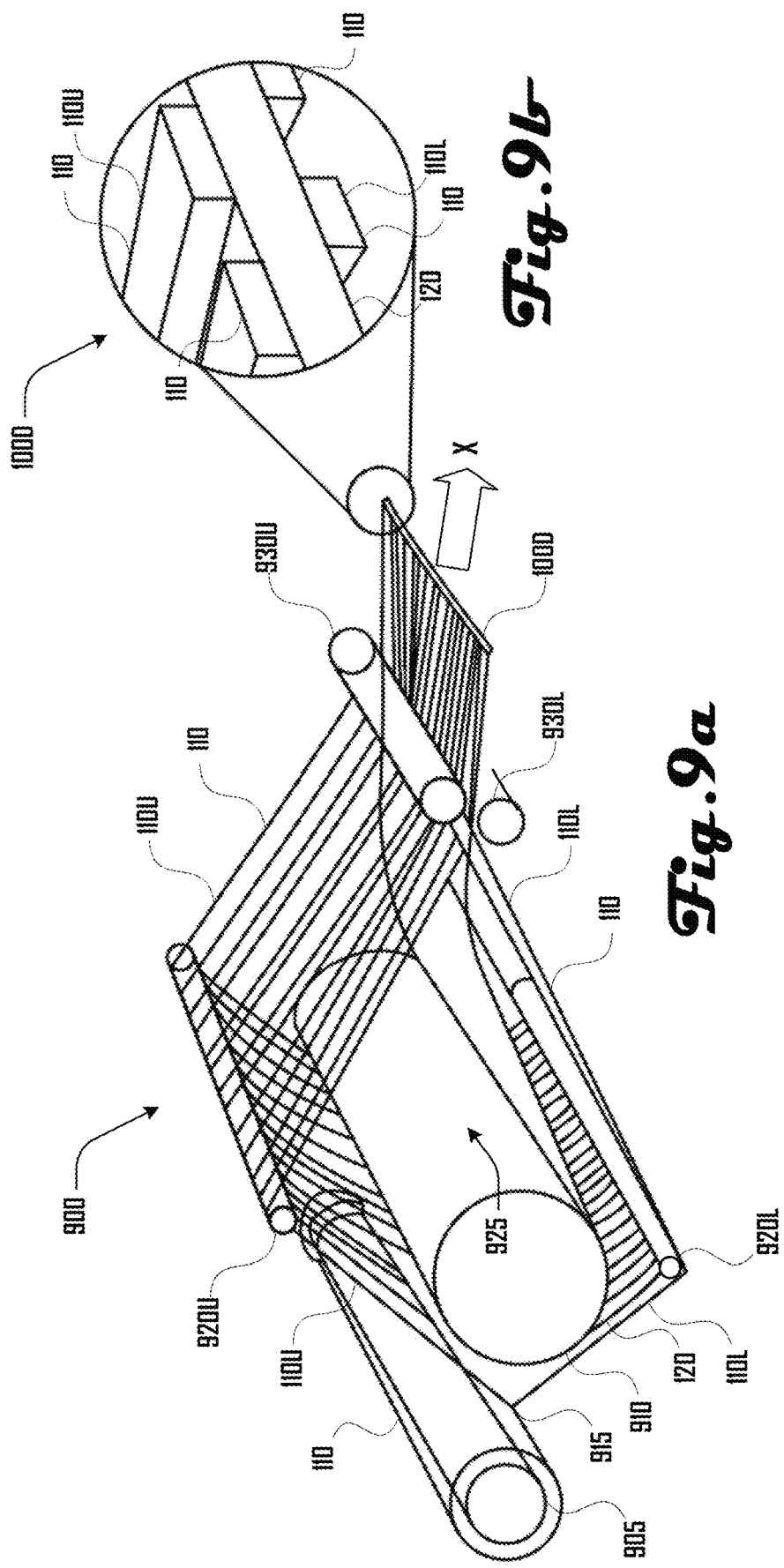

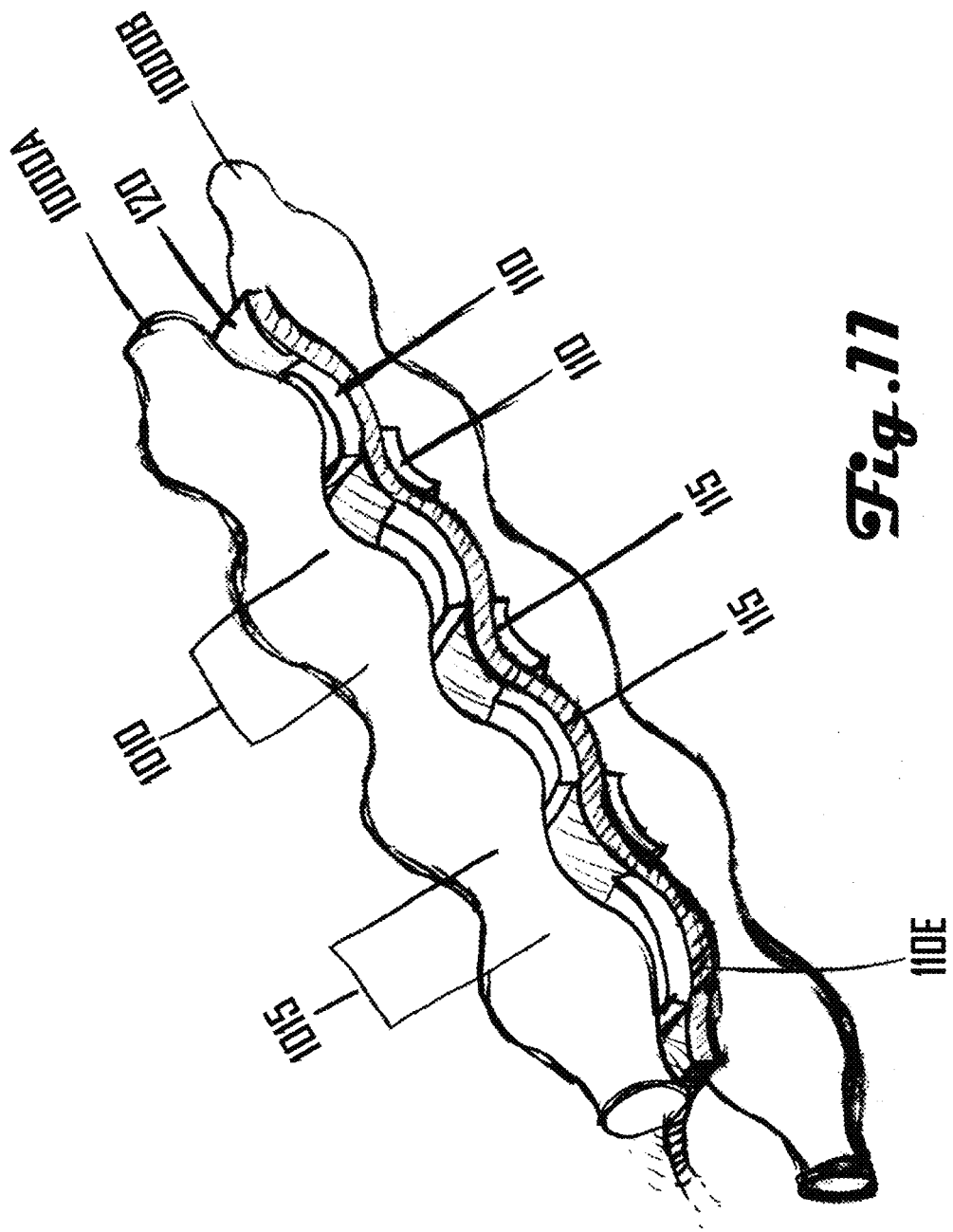

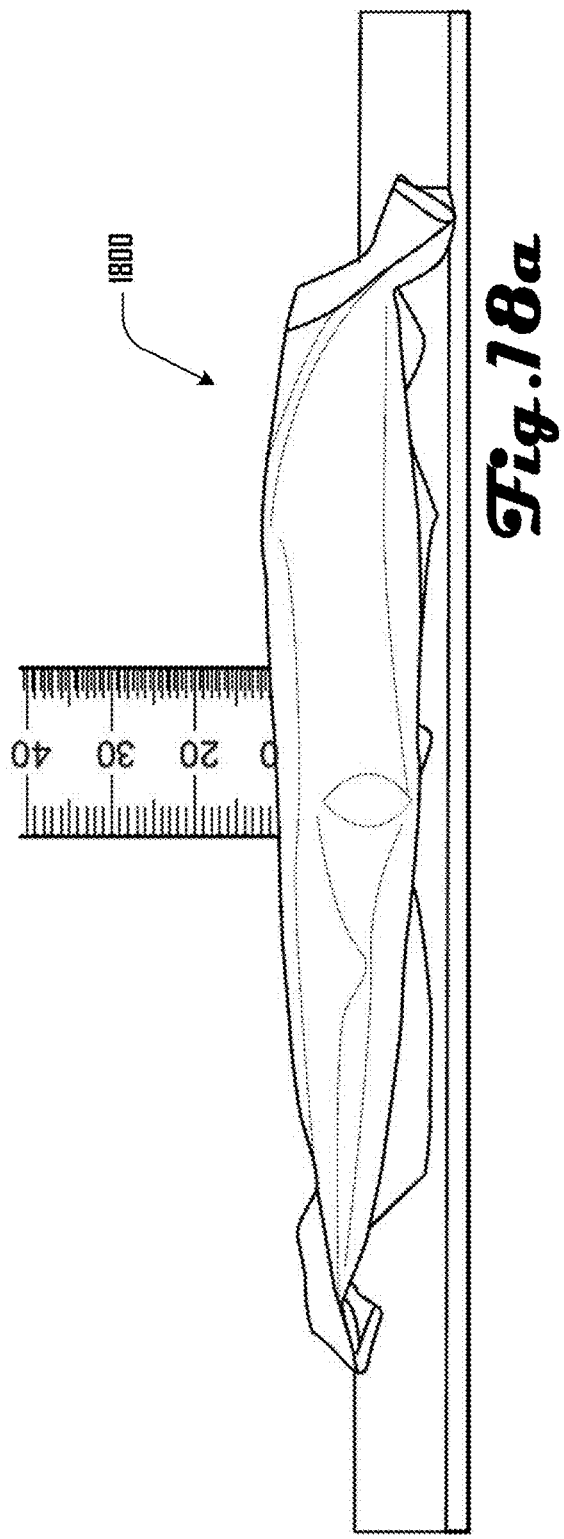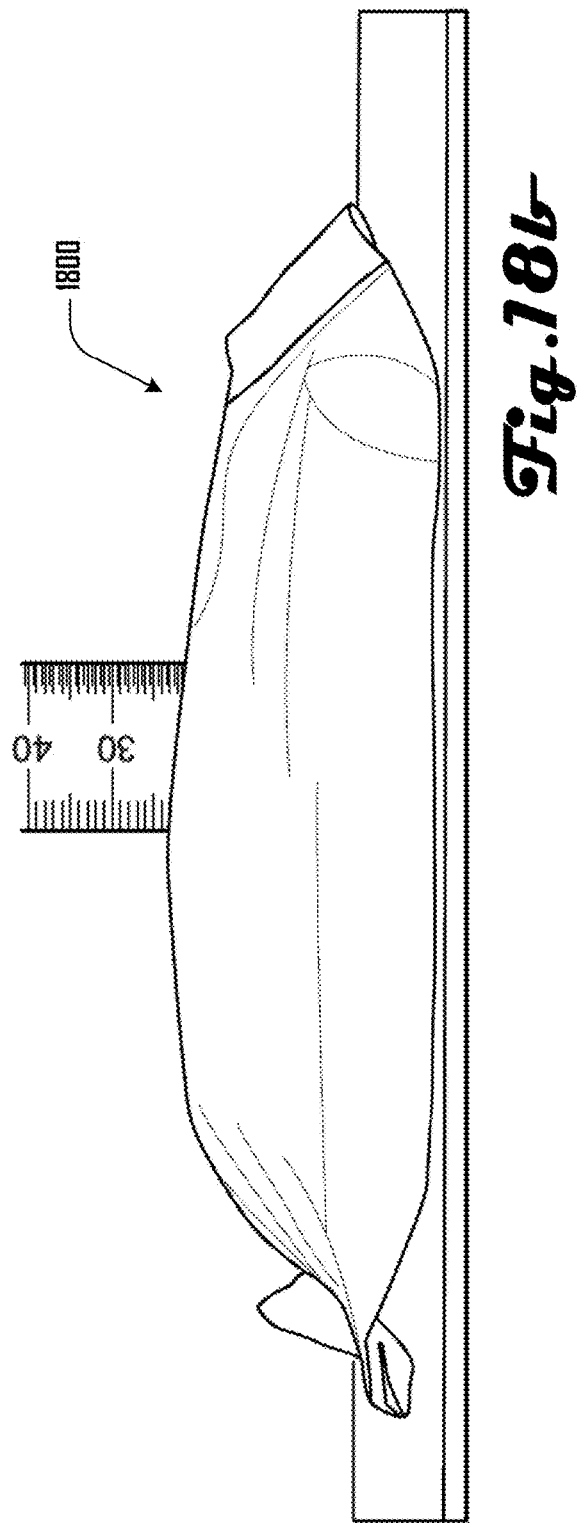

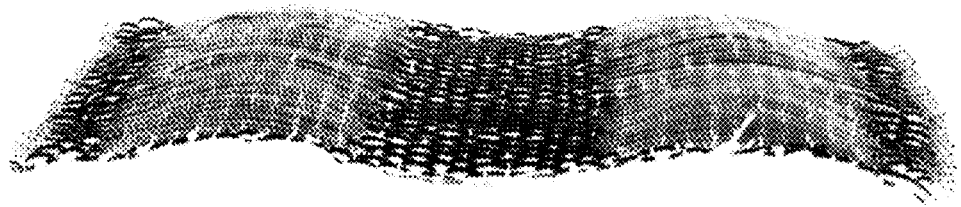
30 °C (86 °F)
Fig.19a
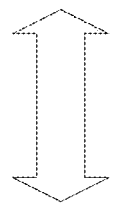
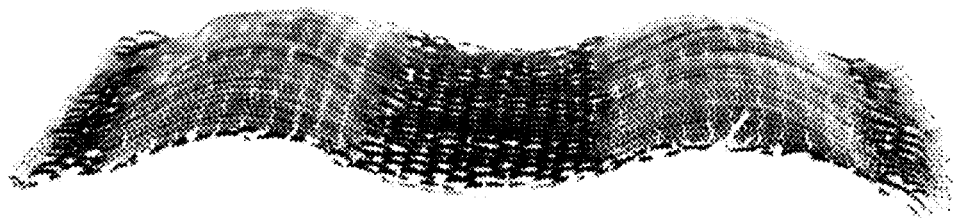
7 °C (45 °F)
Fig.19b

SYSTEM AND METHOD FOR THERMALLY ADAPTIVE MATERIALS

CROSS-REFERENCE TO RELATED APPLICATIONS

This application is a continuation of U.S. patent application Ser. No. 15/160,439, entitled SYSTEM AND METHOD FOR THERMALLY ADAPTIVE MATERIALS, filed May 20, 2016, which is a non-provisional of and claims priority to U.S. Provisional Patent Application No. 62/164,740 entitled SYSTEM AND METHOD FOR THERMALLY ADAPTIVE MATERIALS, filed May 21, 2015 and which is also non-provisional of and claims priority to U.S. Provisional Patent Application No. 62/257,126 entitled SYSTEM AND METHOD FOR THERMALLY ADAPTIVE MATERIALS, filed Nov. 18, 2015, each of which applications is incorporated herein by reference in its entirety and for all purposes.

STATEMENT REGARDING FEDERALLY-SPONSORED RESEARCH

This invention was made with Government support under DE-AR0000536 awarded by the U.S. Department of Energy. The Government has certain rights in this invention.

BACKGROUND

Insulating materials are conventionally static, with their insulation values largely unresponsive to changes in ambient conditions. In view of the foregoing, a need exists for an improved adaptive material system and method for in an effort to overcome the aforementioned obstacles and deficiencies of conventional insulating materials.

BRIEF DESCRIPTION OF THE DRAWINGS

FIG. 1a is an illustration of an example bimorph comprising a first and second material at a flat temperature, where the bimorph is flat and unbent.

FIG. 1b shows the bimorph of FIG. 1a at a different temperature and in a bent configuration.

FIG. 2a is an illustration of an example bimorph with alternating structure comprising a first and second material where the first material is shown in an alternating pattern on opposite sides of the second material and coupled at respective coupling planes.

FIG. 2b shows the bimorph of FIG. 2a at a different temperature and in a bent configuration.

FIG. 3 shows an example bimorph architecture in a lofted state that comprises a first and second bimorph.

FIG. 4a shows an example bimorph structure configured to bend along two axes.

FIG. 4b shows the bimorph of FIG. 4a at a different temperature and in a bent configuration.

FIGS. 5a and 5b illustrate an example of how the bimorph of FIGS. 1a and 1b can be used in plurality as a loose thermally-adaptive fill material, or the like.

FIG. 7 shows an overhead or plan view of a structure comprising four example two-layer bimorphs interconnected in a repeating tile or unit cell that can be used to make a bimorph sheet.

FIG. 9a illustrates one example apparatus and method for making a bimorph.

FIG. 9b illustrates a close-up perspective view of the edge of the bimorph of FIG. 9a generated by the apparatus of FIG. 9a.

FIG. 11 shows a flat bimorph structure produced by the roller of FIG. 10.

FIGS. 18a and 18b illustrate a thermally responsive woven structure in a pouch or quilting showing lofting in response to an increase in temperature.

FIGS. 19a and 19b illustrate a thermally responsive woven structure showing lofting in response to a decrease in temperature.

Figure 5B:
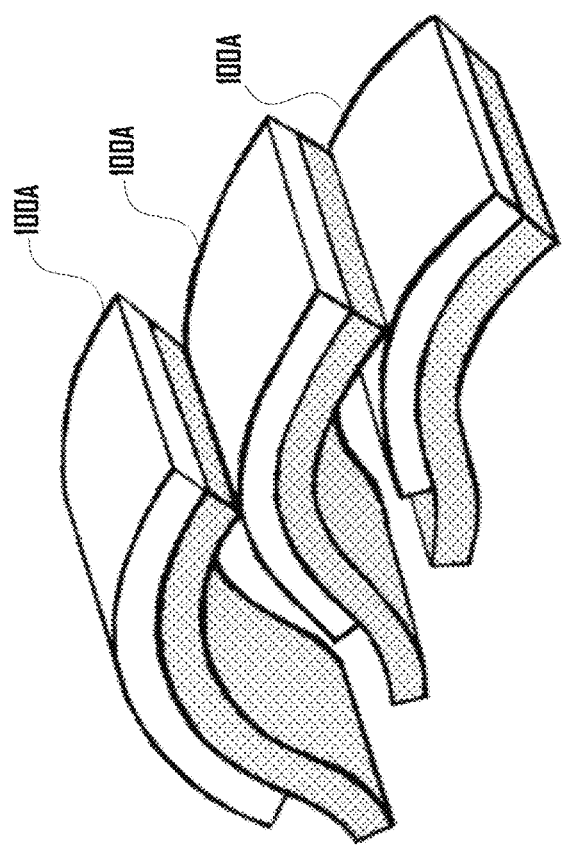

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

For various applications, it can be desirable for a garment, blanket or textile to include an insulating material with a variable insulation—a material that responds to temperature changes. Beyond improved human thermal comfort, such a material can enable considerable energy savings, as more than 10% of energy goes into heating and cooling buildings, and heating and cooling expenses can be reduced through the widespread use of thermally adaptive materials.

In various embodiments, a thermally adaptive material can be a material that alters its insulation value in response to changes in temperature. Such thermal actuation can be achieved through the use of bimorphs or, alternatively, materials that undergo a phase change at a temperature of interest, including but not limited to shape memory polymers and materials that undergo a glass transition. In some embodiments, it can be desirable for bimorphs to respond continuously to temperature changes, bending or straightening as temperature changes.

In contrast, some materials respond with a phase change that occurs at a discrete temperature, creating a stepped response to temperature. Such materials can be used in accordance with various embodiments to achieve a continuous response profile by using a set of materials with different phase change temperatures.

A bimorph can comprise two or more materials laminated, glued, welded, or otherwise joined, held, or constrained to be together in any suitable way. In some embodiments, a bimorph can possess distinct thermal expansion characteristics such that as the environmental temperature changes, one side of the bimorph expands more than the other, causing the bimorph to bend. A bimorph can have a "flat temperature"—a temperature where the structure is flat. In some embodiments, both above and below such a "flat temperature" the bimorph can curve, in opposite directions, due to the difference in thermal expansion in the two layers.

This temperature-controlled bending in bimorphs can be leveraged to construct fabrics and garments with temperature-dependent properties—fabrics that become thicker when temperatures drop, thereby becoming more insulating, and/or fabrics that becomes more open when temperatures increase, thereby becoming more porous and allowing for more cooling.

In order to achieve the relatively large changes in thickness that can be desirable for a thermally adaptive material, the arrangement of bimorph fibers, ribbons, or sheets can be controlled so that the combined changes across multiple layers yield the desired change.

The amount of change in an individual bimorph's displacement can depend on the difference in temperature, the difference in the coefficients of thermal expansion for the two or more materials in the bimorph, the stiffness of the materials, and the thickness and length of the bimorph. The difference in thermal expansion coefficients can be small, and for commodity materials at most, on the order of 100-200 µm/m/K, in some embodiments.

For example, a change in thickness of approximately 1 mm can be taken to be a target for some clothing and bedding applications. Taking 10 microns to be an example assumed thickness for each of the layers in a bimorph (a thickness comparable to a thin fiber) and a temperature change of 10 Kelvin (a reasonable range of change for indoor temperature), then in order to achieve a displacement of 1 mm the fiber would need to be 10 mm in length. For the bimorph to undergo this change it may need to be free to move over its entire length and any contact with other fibers or surface layers might diminish or even entirely block the motion in some embodiments. Free fiber motion over such a length is unlikely in various garment embodiments, and some embodiments of bimorphs at this length and thickness scale can suffer from a low structural resistance to external forces. While this bimorph would produce an effective thickness of 1 mm, when flat the bimorph would be impractically thin. This problematic thinness, as well as the problematic large bimorph length, can be addressed through the use of a multilayer bimorph structure.

In some embodiments, thermally responsive material thickness changes on the order of 1 mm or more can be achieved through the use of multilayer bimorph structures. In such applications, it can be desirable for the thermally adaptive materials to double, triple, or even quadruple their thickness to provide increased comfort as ambient temperatures cool. Built from a plurality of shorter bimorphs with individually smaller displacements, each of these bimorph layers can be mechanically coupled within the structure so that the displacement of each layer can contribute to the overall thickness change in the material. The combination of controlled structure within the bimorph layer and controlled relationships and structure between layers can yield a material capable of realizing the desired cumulative thickness change in response to temperature. Additionally, in some embodiments, multilayer bimorph structures can have an improved capacity to resist external loads such as the tension or weight from facing fabrics or the load from wind.

One advantage of some embodiments of such a multilayer structure can be that a large change in the structure's height is possible with only a small length. Relative to thickness, a beam can undergo a large change in displacement by having a large length, but a long length, free to move, may not be desirable for some embodiments of clothing and bedding. Additionally, the forces required to prevent such motion can become smaller as that length is increased. In various embodiments, by moving to many structured layers, each with a small length, a large change in height can be realized with only a small overall length.

Stated another way, some embodiments of a multilayer structure can have an advantage in that its structure places individual bimorphs in positions that reinforce each other and build on each other as the layers undergo geometric change in response to temperature change, creating a large overall thickness change; some embodiments of multilayer structures can have large thickness changes because they sum the smaller change in each of the individual bimorph layers. In isolation, individual layers of some embodiments can achieve large loft changes through materials selection, large temperature changes, small thicknesses, or long lengths.

In some embodiments, multilayer thermally actuated structures can be constructed so that the majority of physical change is in one dimension, enabling a relatively large change in thickness while changing minimally in other dimensions. Bimorphs incorporated into yarns, which consist of many individual fibers twisted together, can experience a thickness change and a comparable lateral change. Lateral changes can cause unwanted buckling in the overall material and could also require additional structural elements in a garment to maintain the desired shape. In various embodiments, the anisotropic behavior of a multilayer thermally adaptive structure can overcome these limitations that may be associated with twisted structures such as yarns.

In a conventional twisted structure or in a random batting or nonwoven structure, individual fibers, if they are bimorph fibers, may not be held together in a way where they are guaranteed to move together, in a way where one fiber's curve adds to another fiber's curve to increase the collective material thickness. Additive changes can be desirable in some embodiments, where each fiber's change works cooperatively with neighboring fibers to create a large cumulative loft. Twists, such as those commonly found in yarns, provide an opportunity for fibers to move in opposite directions or to nest together, where one moves into the space created by another's motion. This can result in a yarn or fabric that does not have the full or desired thickness change, which may not be desirable in some embodiments.

Yarns, which comprise a plurality of individual fibers, can introduce tensile stresses into the fibers that are twisted together, and such residual stresses can limit the magnitude of the geometric response in some embodiments. Various embodiments of controlled multilayer structures can be fabricated with minimized stresses, allowing for freer and fuller bimorph motion as temperatures change.

Commercial opportunities for thermally adaptive materials exist, for example, in areas where insulation sits in close proximity to skin and is closely associated with human thermal comfort, such as with apparel, bedding, sleeping bags, and tents. Additional application areas can include, but are not limited to, draperies, upholstery, insulation, medical, filtration, and microfluidics.

In various embodiments, multilayer structures can comprise stacked structures including a number of fibers or ribbons that experience a thermally-induced deflection. Deflection in such a fiber or ribbon can be largely along one dimension and corresponds to the thickness of a garment or blanket; as the width of the ribbon is increased or a number of ribbons or fibers are run in parallel the overall structure starts to resemble a sheet. In some embodiments, linear expansion can occur substantially along two axes of the overall bimorph structure, producing a bending and an effective thickness change along the third axis.

Multilayer thermally adaptive structures can be used in adaptive fills, quilting, or inner layers in garments or blankets, where an outer layer can be selected for abrasion resistance, look, and feel, and an inner layer can be selected for feel and wicking properties. Multilayer thermally adaptive structures can be integrated with waterproofing, windproofing, wicking, or other layers or materials for specific applications, both in structures where additional functionality is added through additional layers or lamination or where additional functionality is added through fibers or yarns knit, woven, or stitched with or through the multilayer structure.

In various embodiments, thermally-driven actuation in these structures can be realized through the use of bimorph structures, as detailed below, but can also be achieved through shape memory polymers or other suitable materials that undergo geometric changes in response to a phase change. Individual bimorphs can be constructed through co-extrusion, lamination, or deposition of one layer onto another through printing, blade coating, or other suitable technique. Where it is desirable to pattern one of the layers differently from the underlying layer, the patterned layer can be printed, coated through a mask, etched, or deposited as a pre-patterned sheet, or the like, and joined to the other sheet through an adhesive, thermal or ultrasonic weld, or some other suitable joining technique. Where it is desirable to pattern both layers similarly and to impart two-dimensional structure such as a ribbon or coil, a prefabricated bimorph sheet can be given its shape by knife cutting, laser cutting, stamping, etching, or similar technique.

Bimorph structures can also be produced in a textile structure where two fibers or ribbons with different properties are organized and constrained in a way that places the two materials into an adjacent and antagonistic relationship. Textile structures can provide a diverse range of patterns and can be printed on, cut, and generally treated as the bimorphs described above.

There can be a temperature gradient across an insulation. In cold environments, this means that the temperature difference between a layer of the insulation at the outside of a garment (colder) and the flat temperature for the layer's bimorph(s) can be substantially larger than the temperature difference between a layer near the skin (warmer) and the flat temperature for the layer's bimorph(s). Layers closer to the skin can undergo only a small change, then, while outer layers can undergo a large change. Due to human thermal regulation, the range of temperature change near the skin may not be as large as that at the surface of a garment, and bimorph layers at the surface of a garment can experience larger temperature ranges than layers near the skin. In some applications, it can be advantageous to employ different bimorph layers, each with unique flat temperatures, throughout the multilayer structure, enabling unique thermal response in layers close to the body when compared to the thermal response in layers close to the surface of the temperature sensitive article.

For thermal comfort in a garment or blanket, at any temperature above a critical value it can be desirable to have the thermally adaptive article in its lowest loft state, with its thickness and insulation values minimized. A simple bimorph in a random twist or unstructured mat can be flat at such a temperature, but either a decrease or an increase in temperature can lead to a curve in the bimorph and an increase in thickness. In some embodiments, this can be undesirable because it means that at high temperatures the bimorph will undergo geometric change and increase insulation, having the same type of behavior that it has at low temperatures.

In various embodiments, multilayer thermally adaptive materials can overcome this problem by entering into a fully flat state above a critical temperature. This can be designed into the structure, where two bimorphs are in a mirrored orientation and push against each other, creating a flat, minimally lofted structure at all temperatures above a selected value. Simple bimorph structures can minimize this problem, in some embodiments, by fabricating the bimorph so that the flat temperature is very high and falls outside of the useful range for the garment. However, this can mean the garment might never reach its minimally lofted state in some applications, which may be undesirable for certain applications.

The following example descriptions largely focus on continuous change of geometry and insulation through bimorphs. However, such structures, as well as those actuated through phase change mechanisms, can produce bi-stable systems, as well, and effective insulation change can be brought about through controlled changes in porosity or optical properties through the geometric manipulation of gratings, optical coatings, or optically active materials that are sensitive to their dielectric surroundings or proximity to neighboring materials, including nanomaterials.

In various embodiments, an individual bimorph or bimorph layer comprises two or more materials joined together. The bimorph can be a fiber, ribbon, sheet, or it can be comprised of two paired fibers, ribbons, or sheets, or it can have a more complicated geometry or cross-section in some embodiments. In some embodiments, the bimorph can include two materials with different coefficients of thermal expansion, but additional materials can be included for improved adhesion between the layers or for modifying some other physical property. In other embodiments, a bimorph can comprise a single material having portions with different coefficients of thermal expansion. In the two materials, a difference in thermal expansion or other dimensional change in response to environmental stimulus causes the bimorph to change its shape.

While various embodiments of a bimorph can comprise two materials laminated together, in some embodiments, the materials do not need to be joined or bonded along their entire length, and there may be a difference in pattern or shape between the two so that they do not always align with each other. In further embodiments, such bilayer structures can exist in a textile structure, such as a weave or knit, where two fibers or fiber layers in the structure are substantially paired together such that their collective behavior is similar to that of a laminated bimorph. As with bimorphs, bilayer structures can be made from a single material in two different forms or with different structures or processing history such that the two layers possess different thermal expansion characteristics, different response to moisture, or different response to some other external stimulus.

Additionally, in some embodiments, it may be advantageous to have an alternating or double-sided bimorph structure where a first material or substrate has a second material with a different coefficient of thermal expansion patterned or laid out on both sides of the first material, where the patterns alternate, causing the individual bimorph to bend in an alternating fashion in response to temperature change.

Alternating bimorph structures can have regions of local curvature and bending without long-range bending. The length and thicknesses of the two materials that minimally comprise the bimorph can be selected for a desired curvature for a given temperature change and can be controlled to create zones of varied curvature within the alternating bimorph layer.

Multilayer thermally adaptive materials can have multiscalar structure that can constrain bimorph motion so that the displacement of the individual bimorphs adds together to produce a large displacement for the multilayer structure. Such constraint can be introduced to simple and/or alternating bimorphs as well as bimorphs with substantially more complicated structures. This interlayer order can be introduced through an adhesive, weld, bond, stitch, or the like between layers, through textile structures like weaves or knits, or through limits imposed by the geometric design of the bimorph structure itself.

The following description of the figures includes several example embodiments, but should not be construed to limit the wide variety of other possible embodiments that are within the scope and spirit of the present disclosure.

FIG. 1A is an illustration of an example bimorph 100A comprising a first and second material 110, 120 at a flat temperature, where the bimorph 100A is flat and unbent. The first material 110 is shown as being defined by a length L1 and a width W1. The second material 120 is shown as being defined by a length L2 and a width W2. In this example, the first material 110 has a shorter length L1 than the length L2 of the second material 120, but the widths W1, W2 are substantially the same. The first and second material 110, 120 can have respective opposing outer faces 111, 121 and can be joined together along a coupling plane 115.

FIG. 1B shows the bimorph 100 of FIG. 1A at a different temperature and in a bent configuration. In this example, the change in temperature has caused the bimorph 100A to bend such that the first material outer surface 111 is bent convexly and a second material outer surface 121 is bent concavely.

The change in configuration of the bimorph 100A from a flat configuration (FIG. 1a) to bent configuration (FIG. 1b) can occur in various ways. For example, Table 1 illustrates five examples of how such a configuration change can occur.

TABLE 1

Example causes of change in configuration of bimorph 100 from flat configuration (FIG. 1a) to bent configuration (FIG. 1b).

| | First Material (110) | Second Material (120) |
|---|---|---|
| 1 | Expand Along L1 | No change |
| 2 | Expand Along L1 | L2 Expand Less Than L1 |
| 3 | Expand Along L1 | Shrink Along L2 |
| 4 | No change | Shrink Along L2 |
| 5 | Shrink Along L2 | L2 Shrink More Than L1 |

In various embodiments, examples 1-5 of Table 1 can occur due to a positive or negative change in temperature. Accordingly, in some embodiments, a rise in temperature can cause the first material 110 to expand or contract along L1. In further embodiments, a decrease in temperature can cause the first material 110 to expand or contract along L1. Similarly, in some embodiments, a rise in temperature can cause the second material 120 to expand or contract along L2. In further embodiments, a decrease in temperature can cause the second material 120 to expand or contract along L2. Additionally, in some embodiments, the first or second material 110, 120 may not expand or contract along their respective lengths L1, L2 due to a temperature change, either positive or negative.

In some embodiments the bimorph 100 can be configured to exhibit a change in area no more than 5% in response to a temperature change of 10° C. In further embodiments, the bimorph 100 can be configured to double its effective thickness in response to an environmental change of 10° C. or less.

FIGS. 1a and 1b illustrate an example configuration change wherein the bimorph 100A bends so that the second material outer face 121 becomes concave; however, in further embodiments, the bimorph 100A can assume a further configuration (not shown) where the second material outer face 121 becomes convex and the first material outer face 111 becomes concave. For example, in one embodiment, the bimorph 100A can assume a flat configuration (FIG. 1a) at a temperature of X° C. and assume a bent configuration where the second material outer face 121 becomes convex (FIG. 1b) at a temperature of (X+Y) ° C. Additionally, the bimorph 100A can assume a bent configuration where the second material outer face 121 becomes concave (not shown) at a temperature of (X−Y) ° C. In other words, in some embodiments, a bimorph 100 can bend in one direction and then in another direction based on changing temperatures. Additionally, in various embodiments, as illustrated by the double arrow, a bimorph 100 can dynamically move back and forth between configurations based on temperature change.

Additionally, although various embodiments herein discuss changes in a bimorph 100 based on changes in temperature, in further embodiments, a bimorph 100 may change configuration based on one or more changing conditions, including humidity, light exposure, exposure to a chemical, exposure to a liquid (e.g., water), barometric pressure, force applied (e.g., via wind or touch), magnetic field exposure, exposure to an electrical current, or the like. Accordingly, the example embodiments discussed herein should not be construed to be limiting on the wide variety of alternative and additional embodiments that are within the scope and spirit of the present invention.

FIG. 2A is an illustration of an example bimorph 100B with alternating structure comprising a first and second material 110, 120 where the first material 110 is shown in an alternating pattern on opposite sides of the second material 120 and coupled at respective coupling planes 115. In this example, two portions P1, P2 are defined by a respective pair of first and second material 110, 120 having opposing outer faces 111, 121. FIG. 2 illustrates the bimorph 100B at a "flat temperature" where the bimorph 100B is in a flat and unbent configuration.

FIG. 2B shows the example bimorph 100B of FIG. 2A at a different temperature. The change in temperature in this example has caused the bimorph 100B to bend in an "S" shape. More specifically, in the bent configuration of FIG. 2B, the first and second material 110, 120 have bent such that the second material outer faces 121 are concave and the first material outer faces 111 are convex. As discussed herein, such bending can be generated by various characteristics of the materials 110, 120. Although, FIGS. 2a and 2b illustrate one example wherein an example bimorph 100B includes two portions P1, P2 of alternating structures of first and second material 110, 120, in further embodiments, such a bimorph 100B can comprise any suitable plurality of portions P, and a plurality of bimorphs 100 can be combined into a bimorph architecture.

For example, FIG. 3 shows an example bimorph architecture 300 in a lofted state that comprises a first and second bimorph 100B₁, 100B₂. Each elongated bimorph 100B shown in FIG. 3 comprises a first, second and third portion P1, P2, P3 that comprises a first material 110 coupled on alternating sides of a planar elongated second material 120. The bimorphs 100B are coupled at respective ends 303, 304 and define an internal cavity 305 having a height H. In this example, the first and third portions P1, P3 are defined by the first material 110 being disposed on the second material 120 facing within the cavity 350. The second portion P2 is defined by the first material 110 being disposed on the second material 120 outwardly facing on respective top and bottom sides 301, 302.

In the example shown in FIG. 3, the bimorphs 100B are in a bent configuration based on environmental temperature, generating a lofted configuration of the architecture 300 wherein the first bimorph is centrally bent upward toward the top end 301 and centrally bent downward at the bottom end 302. However, in some embodiments, the bimorphs 100B can be more or less lofted based on temperature. In other words, the height H of the cavity 350 can expand or contract based on changes in temperature.

Although the example shown in FIG. 3 illustrates an example architecture 300 having bimorphs 100 of limited width W, in further embodiments, the bimorphs 100 can be elongated planar sheets that can comprise a fabric, or the like. Similarly, although FIG. 3 illustrates an example architecture 300 having bimorphs 100 with three portions P1, P2, P3 coupled at ends 303, 304, in further embodiments, bimorphs 100 can comprise any suitable plurality of portions, with opposing portions being coupled at any selected interval, either regular or irregular. For example, in some embodiments, bimorphs 100 having a plurality of portions need not be coupled only at ends 303, 304 and can instead be coupled between ends, which can generate a plurality of cavities 350.

Additionally, in some embodiments, bimorphs 100 can be coupled in any desirable way along with width and/or length of the bimorphs 100 or can be coupled in any other desirable regular or irregular pattern that may or may not include coupling parallel to a length or width of the bimorph 100. Accordingly, as discussed in more detail herein, in some embodiments, a bimorph architecture 300 can define a planar sheet, which can comprise a fabric or the like, which defines a plurality of cavities 305 of various suitable sizes and shapes. As discussed herein, such a fabric comprising a bimorph 100 and/or bimorph architecture 300 can dynamically change configuration based on temperature, which can be desirable for various purposes.

For example, in one embodiment, and referring to FIG. 3, a bimorph architecture 300 can change configuration such that the height H of one or more cavity 350 increases with lower temperature, which can be desirable for dynamically generating insulation from a cold environment. In other words, a jacket, sleeping bag, blanket, bag or other article could change configuration in response to exposure to cold so as to dynamically and increasingly insulate a wearer or article from the cold. On the other hand, on exposure to heat, the height H of one or more cavity decreases with higher temperature, which can be desirable for dynamically preventing overheating of a wearer or article in a warm environment. In other words, where it is desirable to keep a wearer or enclosed article within a certain temperature range, various embodiments can be configured to dynamically provide more or less insulation based on changing environmental temperatures.

FIGS. 4a and 4b show an example bimorph structure 400 configured to bend along two axes. The example bimorph structure 400 comprises four bimorphs 100C that each comprises a triangularly shaped first and second material 110, 120 that are stacked along a coupling plane 115. The bimorphs 100C are joined together in a rectangular configuration abutting at respective edges 415 and coupled together at a central location 420. In various embodiments, the coupled central location can comprise a portion of the edges 415 adjacent to the central location 420. In this example, opposing bimorphs 100C in the structure 400 have the same material 410, 420 on a top face 401 and bottom face 402.

FIG. 4a illustrates the bimorph structure 400 in a flat configuration. FIG. 4b illustrates the bimorph structure 400 in a curved configuration where the opposing bimorphs 100C with the second material 120 on the top face 401 have curled upward to generate a concave portion on the top face 401. Additionally, opposing bimorphs 100C with the second material 120 on the bottom face 402 have curled downward to generate a concave portion on the bottom face 402. As discussed herein, the structure 400 can move between the configurations of FIGS. 4a and 4b based on changing temperature.

Many similar geometries, structures, and slitting patterns can be provided in further embodiments to accomplish a similar geometry change. For example, further embodiments can comprise any suitable plurality of bimorphs 100 arranged about a central location 420. The shape of the bimorphs 100 and the overall shapes of a structure generated by such bimorphs can be any suitable regular or irregular shape.

Figure 5A:
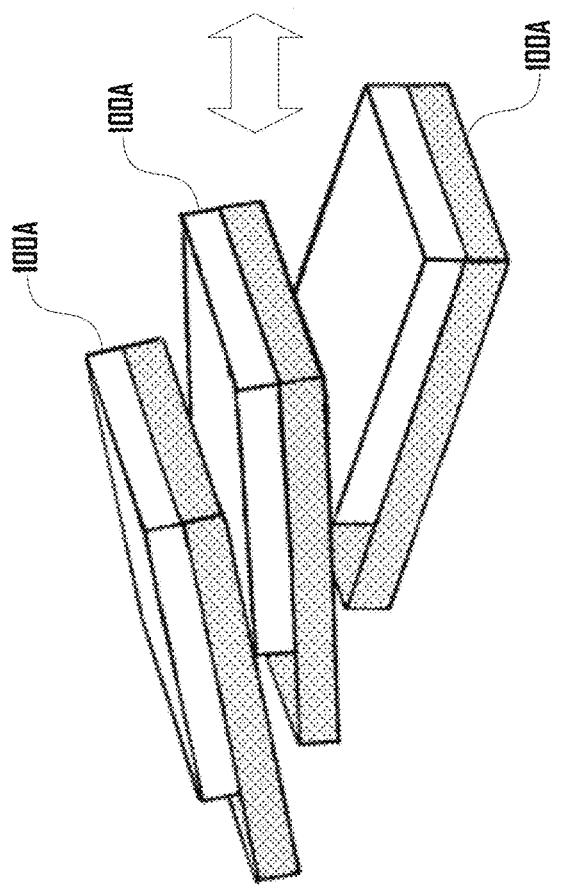

In various embodiments, such structures can serve as loose thermally-adaptive fill material. To achieve a large thickness change from multiple layers of such a single bimorph layer structure 400, in some embodiments, it can be advantageous to have a plurality of similar but non-identical structures to prevent the cupped three-dimensional shapes from nesting within each other. The varied three-dimensional structure can serve as an organizing constraint in a multi-scalar structure. In some embodiments, a plurality of such bimorphs 400 can be disposed in a cavity 350 (FIG. 3) as described above. FIGS. 5a and 5b illustrate an example of how the bimorph 100A of FIGS. 1a and 1b can be used in plurality as a loose thermally-adaptive fill material, or the like.

Figure 6B:
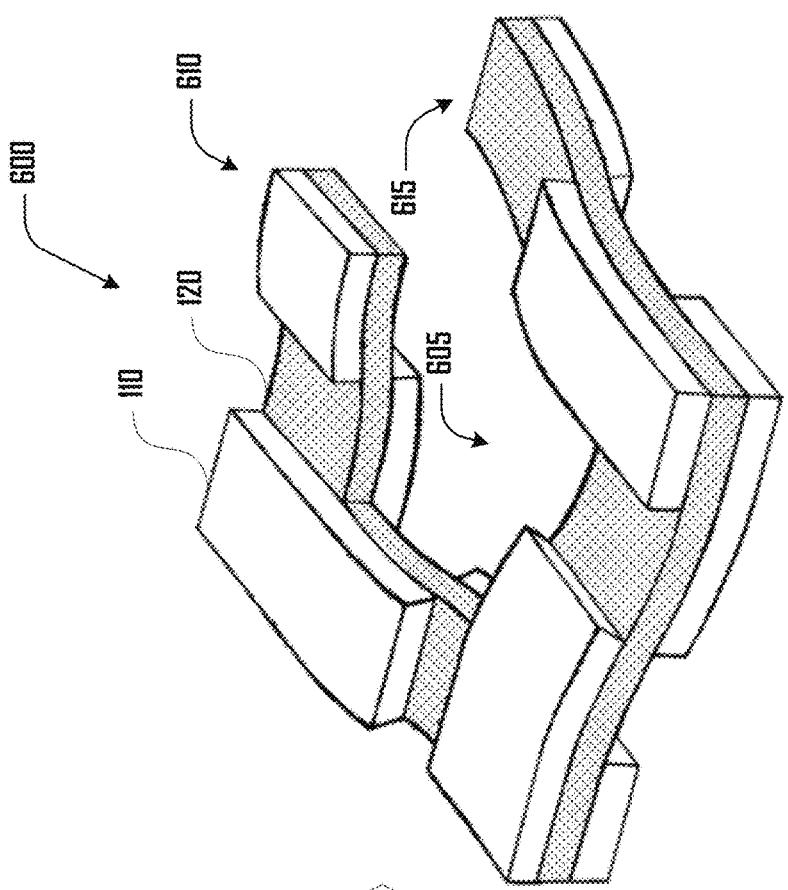
FIG. 6b shows the bimorph structure of FIG. 6a undergoing a displacement in response to a temperature change.
Figure 6A:
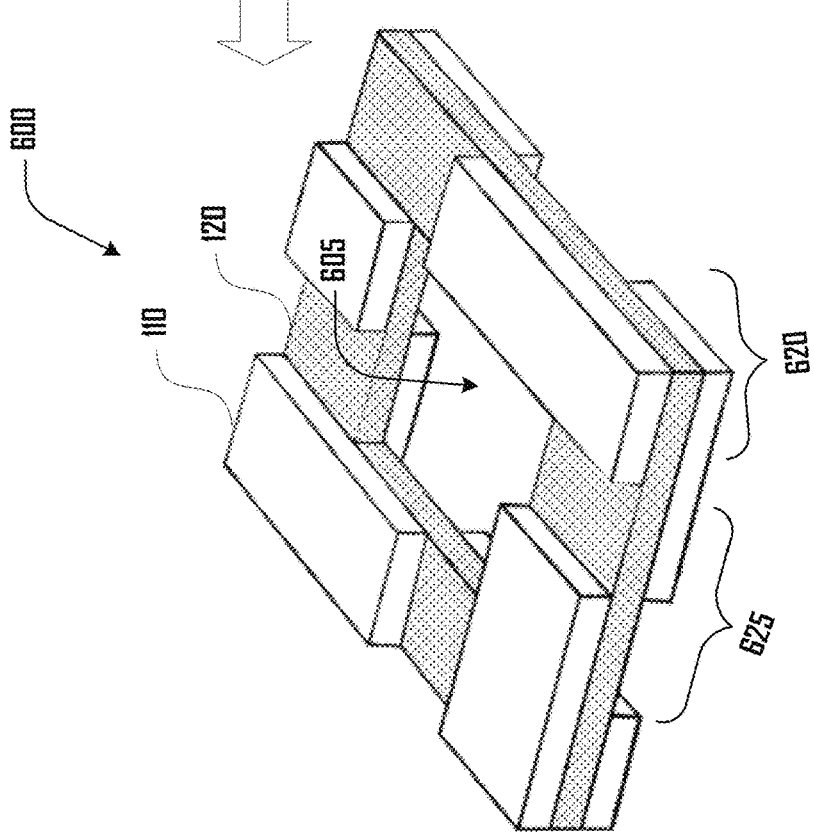
FIG. 6a shows an example serpentine bimorph structure at a flat temperature.

FIG. 6A shows an example serpentine bimorph structure 600 at a flat temperature. The bimorph structure 600 can comprise two materials 110, 120, which can be joined together and can have the same overhead or cut pattern. In this example, a substantially contiguous second material 120 is present in a rectangular shape defining a central cavity 605, with portions of the first material 110 disposed on opposing sides of second material 120 in an alternating configuration. In some embodiments, the structure 600 can exhibit a geometric change along more than one axis.

FIG. 6B shows the coil or convoluted structure 600 undergoing a displacement in response to a temperature change; the end of a first arm 610 of the structure 600 is lifted relative to a second arm 615, which can serve as a base in some embodiments. The first and second arm 610, 615 can be considered the end and beginning of the bimorph structure 600, but alternatively a thermally non-responsive pad can be introduced to the first arm 610, or the second arm 615 can consist of only one of the materials 110, 120 so that it would not undergo any bending in response to a temperature change. Additionally, in one embodiment, the arms 610, 615 can have different shapes so that they can serve as pads for connecting to other bimorphs or bimorph structures. Within an individual layer, the bimorph structure 600 can be connected directly, through thin tethers, or the like, to other bimorph structures such that an interconnected sheet, thin film, or membrane is produced.

The example structure 600 in FIGS. 6A and 6B are shown with a cavity in the center, but there are many alternative coils or serpentine structures that can be provided in further embodiments—both with and without holes introduced for porosity. Many similar geometries and structures can be provided in further embodiments that can be fine-tuned for specific applications, including structures similar to a plane spring or diaphragm flexure.

Additionally, the example structure 600 is illustrated as having portions 620 with the second material 120 stacked between two pieces of the first material 110 and also portions 625 defined by a stack of a single piece of first and second material 110, 120. In various embodiments, portions 620 having a stack of three or more materials can generate a "flat zone" in the structure 600 that is not bent in response to temperature change even if other portions do bend. This can be because any change in the top and bottom material of the stack that are the same can cancel each other out in that portion of the structure 600 and therefore result in no bend in that portion 620. Although portions 620 having a stack of three materials is shown on the corners of the example structure 600, in other embodiments, such portions 620 can be present on any suitable portion of a given structure. Similarly, portions 625 defined by a stacked pair of materials 110, 120 can also be present in any suitable location of a bimorph structure in some embodiments.

In some embodiments, the coiled or serpentine structure 600 does not, by itself, introduce a geometric constraint that makes it ideal for multilayer structures. However, by using a number of geometries with a similar temperature-displacement response but varying the specific convolutions, sheets of interconnected coils or serpentine structures may not be readily able to intertwine or move into the open space left by temperature-responsive bimorphs. This type of convoluted serpentine structure can find a role as one component in multilayer thermally adaptive structures in accordance with further embodiments.

FIG. 7 shows an overhead or plan view of a structure 700 comprising four example two-layer bimorphs 100 interconnected in a repeating tile or unit cell that can be used to make a bimorph sheet. One of the materials is shown shaded, and it serves as a substrate throughout this example embodiment. Solid lines represent cuts through the material, dashed lines indicate the end of the top material, which is unshaded, sitting on top of a substrate material, and dotted lines indicate the edge of the structure 700. The overall structure 700 can be a repeating unit cell, creating a large sheet of interconnected bimorphs.

The bimorph region is broken into four bimorph cantilevers 100 here, and each of the four can move out of plane at the center of the structure in response to temperature change. The region shown with only the substrate material 120, which is shaded, can serve as a flexible tether or connection between the bimorphs 100 of this unit cell and adjacent unit cells. In some embodiments, this connection does not need to have a temperature-bending response. This connection between bimorphs can create a flexible sheet with temperature responsive thickness.

To achieve a large thickness change, a multilayer structure can be desirable in various embodiments. Multi-scalar order between layers such as that shown in FIG. 7 can be introduced, for example, by alternating the orientation of each layer so that every other layer is orthogonal to the layer immediately above it and the layer immediately below it. The base of the layer stands on the orthogonal bimorph of the layer below, and the lifted bimorph of the layer serves as a support to the orthogonal base of the layer above. Given the aspect ratio of the bimorph region, the orthogonal rotation between layers causes each layer to span at least two bimorph regions in the layer beneath it in various embodiments, ensuring that the bimorphs from one layer are supported by the layer beneath and do not fall down into the void space created by the geometric change of the bimorph.

In addition to the inter-layer order arising from the orthogonal orientation of one layer relative to another, the illustrated example structure can have in its unit cell structure a flexible tether that connects individual bimorphs together, side-by-side, in an extended sheet. Sheet structures such as this can be advantageous in that they may be unlikely to bunch up or fall via gravity to the bottom of a quilting pocket, instead remaining in a flat sheet at higher temperatures. The in-plane or in-sheet order can prevent balling or clumping of the adaptive insulation.

The flexibility of the tether can be controlled by changing the width and convolution path of the interconnections. Although shown with a single-sided bimorph active zone, double-sided bimorph geometries can be present in further embodiments, with the inter- and intra-layer order discussed above. Overall, the geometry of the layer and the orthogonal arrangement of layers in a multilayer structure can provide mechanical coupling between bimorph layers.

Sheet structures like those of FIG. 7 can have flexible in-layer interconnects between individual bimorphs, and other bimorph structures can be similarly interconnected. However, some embodiments comprise sheet structures that can connect bimorphs without the need for interconnection space. One such structure comprises of an array of dots on a substrate, with concentric rings of the same material on the other side of the substrate, forming a double-sided bimorph with circular structure. Such a material can form a dimpled surface as temperature changes, with thickness changes coming from the materials distortion along two axes. While flexible tethers can be used between the active regions of such a dimpling surface, the circular structures can be arrayed in such a way so as to place the bimorph regions at a maximum area density and interconnections can be direct between neighbors.

In some embodiments, dimpled structures, and, indeed, various sheet structures, can have undesirable breathability due to the non-porous structure. Accordingly, in various embodiments, small holes or slits can be introduced into these multilayer structures to provide enhanced opportunities for vapor transport and evaporation. Additionally, temperature responsive geometry changes in the multilayer structure can serve to increase or decrease porosity.

The arrangement and alignment of one bimorph relative to another can be desirable in some embodiments for the effective temperature-response of the multilayer collection of bimorphs. This order can come through joints or bonds, as illustrated in FIG. 3, or through mechanical constraints imposed by the geometric design and orientation of each of the layers, as illustrated in FIG. 7. Approaches, such as weaving, can be also appropriate for introducing order into the multilayer structure so that two bimorph regions overlap and their individual temperature-dependent thicknesses add together in an optimized way. These multilayer structures can be built of individual layers that comprise single-sided, double-sided, or more complicated bimorphs, structures with mechanical amplification, or actuation mechanisms that do not include bimorphs. In various embodiments, the porosity and flexibility of each individual layer can be controlled through holes, slits, or convoluted serpentine structures within the layer, or the like.

Figure 8A:
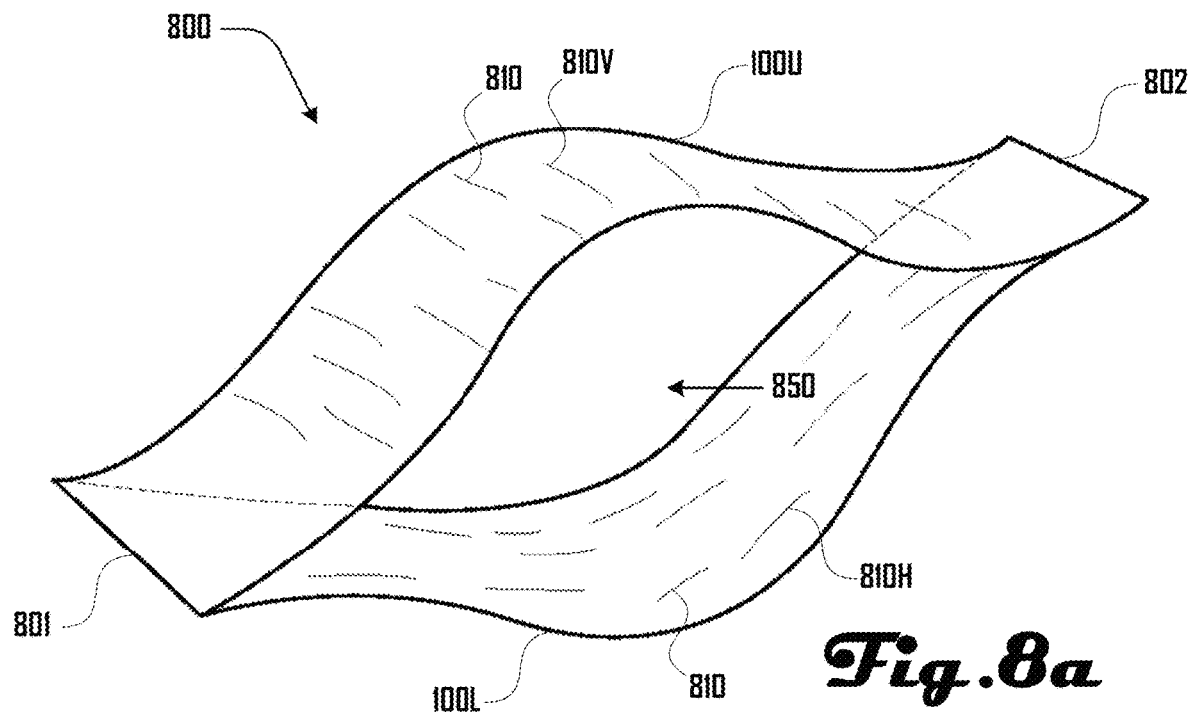
FIG. 8a illustrates an open configuration of a bimorph structure, wherein the bimorphs form a cavity that separates respective wires on the upper and lower bimorphs.
Figure 8B:
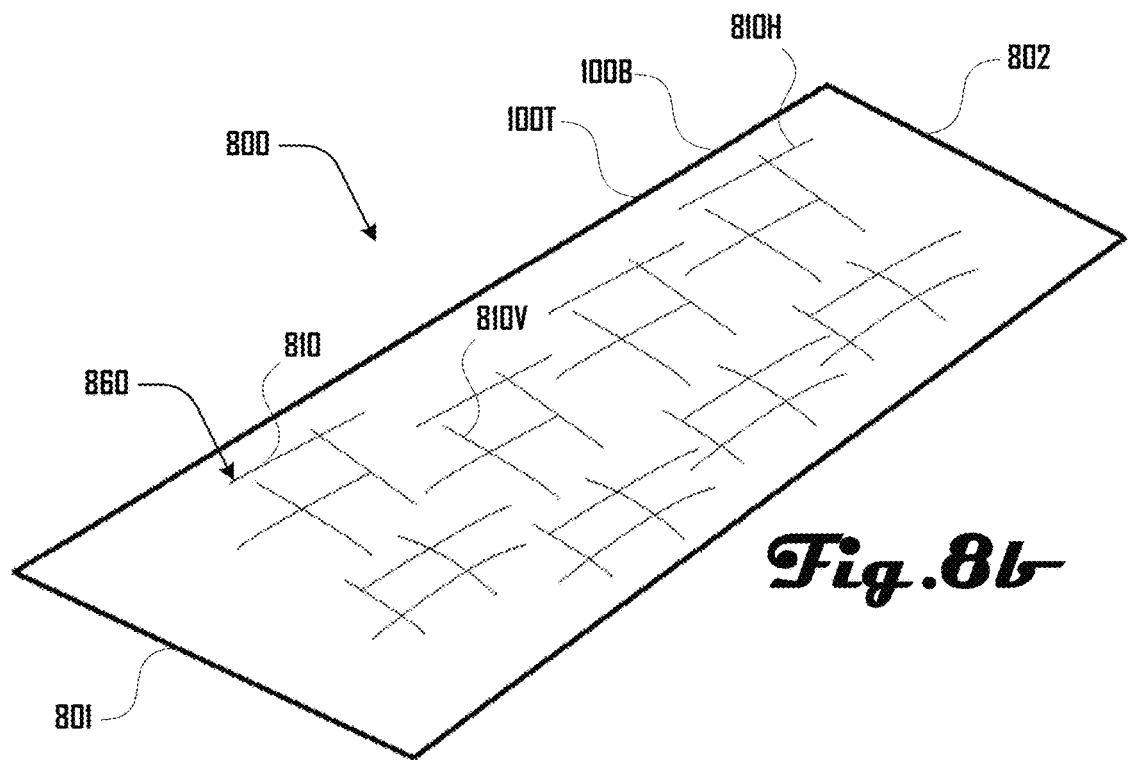
FIG. 8b illustrates a closed configuration of bimorph structure of FIG. 8a, wherein the bimorphs are in contact with horizontal and vertical wires in contact or in close proximity.

FIGS. 8a and 8b illustrate a bimorph structure 800 that comprises an upper and lower bimorph 100U, 100L coupled at respective ends 801, 802. The upper bimorph 100U in this example is shown comprising a plurality of vertically oriented wires 810V and the lower bimorph 100L is shown comprising a plurality of horizontally oriented wires 810H. FIG. 8a illustrates an open configuration of the bimorph structure 800, wherein the bimorphs 100 form a cavity 850 that separates the respective wires 810 on the upper and lower bimorphs 100U, 100L. FIG. 8b illustrates a closed configuration of bimorph structure 800, wherein the bimorphs 100 are in contact and the cavity 850 is substantially absent. The horizontal and vertical wires 810H, 810V are shown being in contact or in close proximity in FIG. 8b.

In various embodiments, a metallic nanowire mesh structure can generate reflectivity in the thermal infrared region. In the example of textile applications, a piece of clothing comprising such a nanowire mesh structure can generate insulation of a garment by reflecting thermal energy back at the wearer of the garment.

In the context of FIGS. 8a and 8b, in some embodiments, the bimorph structure 800 can dynamically provide insulation by changing configurations to generate a thermal infrared reflective mesh 860 as shown in FIG. 8b, and breaking the thermal infrared reflective mesh 860 by separating the wires 810 as shown in FIG. 8a. In other words, when the respective wires 810 of the upper and lower bimorphs 100U, 100L are coupled as shown in FIG. 8b, the bimorph structure 800 can generate reflectivity in the thermal infrared region, whereas when the respective wires 810 of the upper and lower bimorphs 100U, 100L are separated as shown in FIG. 8a, the thermal infrared reflective properties of the bimorph structure 800 can be removed.

Accordingly, in various embodiments, it can be desirable for the configuration shown in FIG. 8a to be generated in warmer temperatures, and for the configuration shown in FIG. 8b to be generated at colder temperatures. In embodiments where such bimorph structure 800 is present in a garment, this property can automatically help prevent a wearer of the garment from overheating in warm temperatures by transmitting thermal infrared heat through the garment in warm conditions, and can automatically help contain thermal infrared heat in cold conditions.

Accordingly, a bimorph structure 800 as illustrated in FIGS. 8a and 8b can be configured to be used in various articles, including clothing, blankets, sleeping bags, tents, and the like. Additionally, the example structure shown in FIGS. 8a and 8b should not be construed to be limiting on the wide variety of embodiments that are within the scope and spirit of this inventions. For example, the wires 810 can comprise any suitable material and can be oriented in various suitable directions. In addition to reflectivity, the absorptivity of some materials can shift when they are in close proximity to their neighbors, enabling this type of bimorph structure to augment reflectivity and absorptivity properties of the materials, influencing the overall insulation properties of the bimorph materials. Alternatively, the optical properties of some materials or patterned structures—for example, a diffraction grating—can be shifted through physical deformation or stretching, and integration with bimorph structures can yield temperature sensitive optical absorption and reflection properties.

Bimorphs and bimorph structures can be made in various suitable ways. FIG. 9a illustrates one example apparatus 900 and method for making a bimorph 100D. The apparatus 900 comprises a first spool 905 having a wound sheet of first material 110 and a second spool 910 that having a wound sheet of second material 120. The apparatus 900 further includes a cutter 915 that cuts the sheet of first material 115 lengthwise into a plurality of strips of the first material 110. An upper and lower separator bar 920U, 920L separates the plurality of strips of first material 110 into a set of upper and lower strips 110U, 110L, defining a strip cavity 925 between the upper and lower set of first material strips 110U, 110L. The second spool 910 of second material 120 is disposed within the strip cavity 925. In this example, the sets of strips 110U, 110L are generated by separating adjoining strips of first material 110 once they are cut so that every even strip becomes an upper strip 110U and every odd strip becomes a lower strip 110L. Alternatively, upper and lower strips 110U and 110L can comprise fibers, threads, yarns, or ribbons from separate rolls.

The sheet of second material 120 extends from the second spool 910 and through a set of rollers 930U, 930L. The first material strips 110U, 110L also pass through the rollers 930U, 930L and are respectively coupled to a top and bottom face of the sheet of second material 120 to define the bimorph 100D. In various embodiments, the first and second material 110, 120 can be coupled together in any suitable way, including via welding, lamination, fusion, an adhesive, stitching, or the like.

FIG. 9b illustrates a close-up perspective view of the edge of the bimorph 100D generated by the apparatus 900. As discussed above, the upper strips 110U are shown disposed on the top face of the second material 120 offset from the lower strips 110L disposed on the bottom face of the second material. In various embodiments the bimorph 100D can have properties similar to those of bimorph 100B illustrated in FIG. 3 and the bimorph 100D sheet illustrated in FIGS. 9a and 9b can be used to generate a bimorph structure 300 as illustrated in FIG. 3, or the like.

In various embodiments, it can be desirable for the bimorph sheet 100D to comprise perforations, slits, or the like. Such structures can be desirable for breathability, flexibility and/or stretchability. In some embodiments, substrate 120 can be perforated or can be a porous woven, knit, or nonwoven material. In some embodiments, controlled perforation can be desirable for allowing the bimorph 100 to operate with the preferred direction of a monoaxially or biaxially oriented polymer (CTE, modulus, and strength values can all be anisotropic in such materials and a particular direction can be preferred). Some embodiments can comprise a method of manufacturing a double-sided bimorph structure with offset perforated or punctured top and bottom layers that enables alignment of a preferred direction of the layers 110 that comprise the top and bottom portions of the alternating bimorph. In one embodiment, material 110 is not slit into two stripes but is instead punctured or perforated such that it has a striped structure where the solid portions are connected by perforated zones. Perforated material 110 can then be applied to the second material 120, on either one or both faces. Perforations or punctures can be generated in patterns that can run either in the roll-to-roll machine direction or perpendicular to the machine direction, or in any other appropriate direction. The perforated material 110 can be advantageous in some embodiments in that it can be easy to handle with machinery, amenable to both roll-to-roll and sheet processing, and it can enable the selection of a preferred orientation in a thin film for optimal bimorph performance.

In some embodiments, a plurality of bimorph sheets 100D can be arranged in a way where their thickness changes add together to create a thicker structure with a large range of temperature responsive motion. In various embodiments, the bimorphs 100 described herein can be layered and their configuration can allow the layers to be stacked orthogonal to each other, creating a geometric constraint between layers that can prevent the layers from settling into or nesting within each other, forcing each of the layers to "build" on or "lift" off of the layer beneath it. Orthogonal rotation is only one example embodiment, and rotation of other angles can be present in further embodiments. In various embodiments, such a layer-by-layer rotation configuration can avoid interlayer connections such as welds; however, in some embodiments, the individual layers can be coupled together, via adhesives, welds, or lamination, stitches, or the like.

Figure 10:
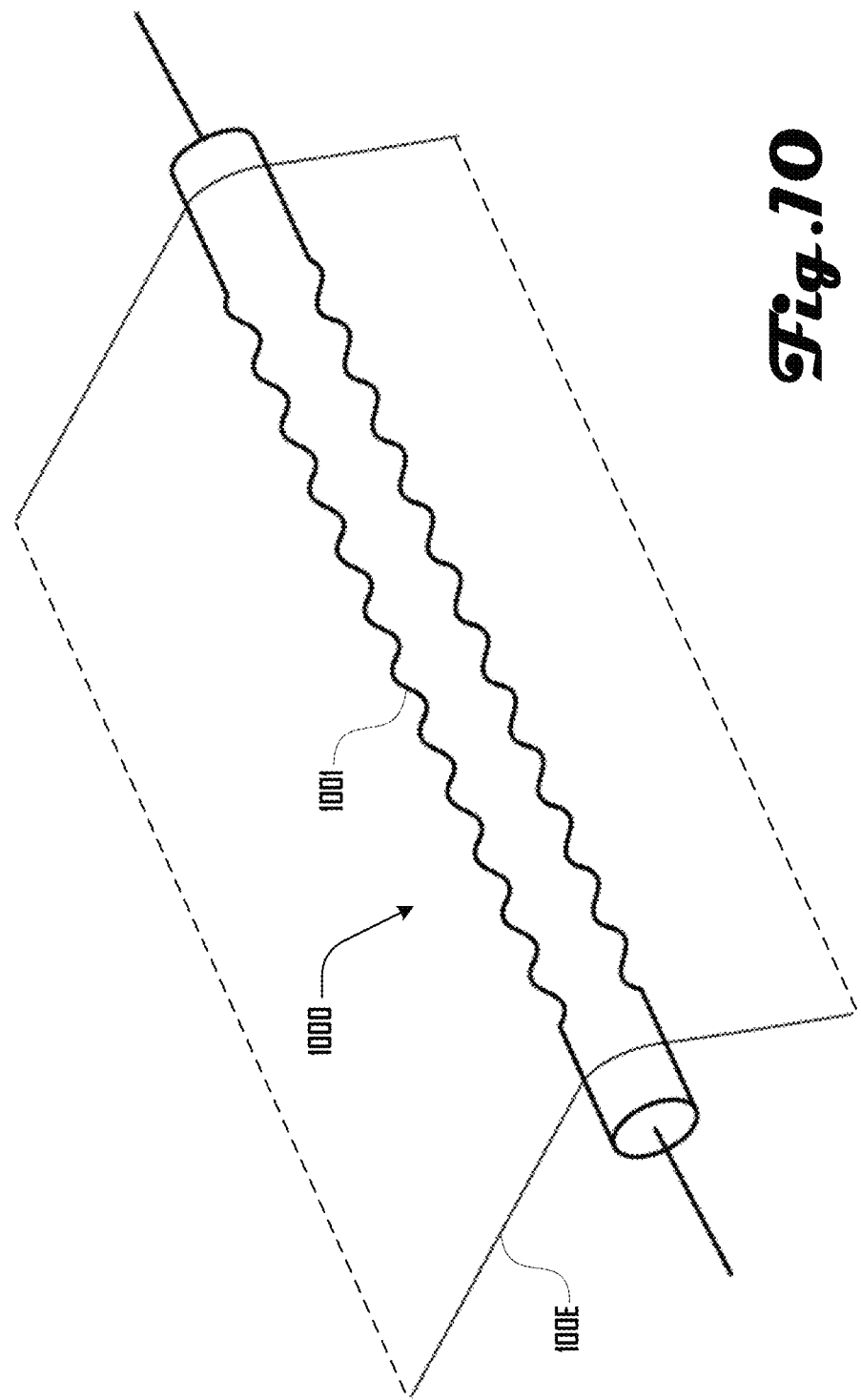
FIG. 10 shows an embodiment of a roller with an undulating surface pattern configured to produce a flat bimorph structure illustrated in FIG. 11.

FIG. 10 shows an embodiment of a roller 1000 with an undulating surface pattern 1001 configured to produce a flat bimorph structure 100E illustrated in FIGS. 10 and 11. In various embodiments, the bimorph structure 100E can be configured to be flat at a desired temperature or within a temperature range. In one preferred embodiment, this temperature or temperature range can correspond to the skin or core temperature of a human or animal subject.

In various embodiments, the roller 1000 and surface texture or pattern 1001 can be configured to provide controlled curvature of the bimorph 100E at the temperature of heat setting, lamination, adhesion, or polymer welding so that as temperature is reduced to ambient or skin temperature the bimorph sheet 100E can realize a flat structure.

In some embodiments, the scale of the patterning of a bimorph 100 can be in the millimeter range, sub-millimeter range or of other desirable size. Additionally, such patterning can cover one or both sides of a substrate, which can be various thicknesses including about 1 µm, 10 µm, 100 µm, 100 µm, and the like. In various embodiments, each side of the bimorph 100 can be registered to the other. In some embodiments, ink jet printing, screen printing, and similar wet techniques can be used on a bimorph 100.

In another embodiment, a first and second material 110, 120 (e.g., polymers) can be laminated together. A laminated bimorph 100 can comprise a central, continuous sheet of the second material 120, and a first material 110 in a parallel series of narrow ribbons on one or both sides of the second material 120. For example, such a structure is illustrated in FIGS. 9a and 9b (strips of first material 110 on both sides of the second material 120) and illustrated in FIG. 11 (strips of first material 110 on one side of the second material 120).

In some embodiments, one or both of the first and second material 110, 120 can comprise or be generated from a continuous sheet having perforations in certain regions, instead of discrete ribbons or strips. Such an embodiment can be desirable because it can simplify manufacturing in contrast to a plurality of discrete strips or ribbons.

As discussed herein, it can be desirable to generate structures of bimorphs 100 via layering a plurality of bimorphs 100. In some embodiments, respective layers may or may not be physically coupled or connected.

For example, in one embodiment, bimorph 100 sheets in accordance with various embodiments can be orthogonally stacked, with their corrugation running in different directions. This can generate a structure with desirable changes in thickness or loft. In such embodiments, layer-to-layer connection or registration may or may not be present.

Due to the materials dynamically changing due to temperature changes, bimorph manufacture can be challenging because the neutral or flat temperature (the temperature at which the bimorph is flat) can be difficult to control, depending on the material and the manufacturing process. For example, thermal welding of materials may lead to a flat temperature at the temperature of the weld, which may be undesirable in some embodiments. Accordingly, in some embodiments, the use of a roller 1000 (FIGS. 10, 11) having an undulating surface pattern 1001 can be desirable for laminating ribbons, strips or sheets and can provide a way of manufacturing with a curve or bend in the material so that when it cools, the material flattens to give a desired neutral or flat temperature.

Accordingly, at the level of bimorph construction or processing, the use of shaped or patterned rollers 1000 for roll-to-roll processing or lamination of strips, ribbons, perforated sheets, punctured sheets, textiles, or the like, can be desirable for controlling the flat or neutral temperature of a bimorph, bimorph sheet, or bilayer structure. Additionally, in some embodiments, the use of perforated or punctured sheets can allow roll-to-roll processing of bimorphs 100 or bimorph sheets where the preferred oriented directions of polymer thin films, or the like, are aligned in a critical dimension for the bimorph 100 or sheet. Such a direction may be desirable due to anisotropic properties (e.g., CTE, modulus, strength, and the like). Such bimorph sheets can also be set to have a flat or neutral temperature through controlled temperature, tension, curvature, and pressure contact area during thermal welding or adhesion of a first and second material 110, 120.

FIG. 11 illustrates a bimorph 100E generated by a top and bottom roller 1000A, 1000B each having an opposing undulating surface 1001. In this example, the bimorph 100E comprises a second material 120 that comprises concave portions 1010 and convex portions 1015 relative to the top side of the bimorph 100E. On the top side of the bimorph 100E, a first material 110 is disposed in the concave portions 1010 of the second material 120.

In the example of FIG. 11, the top and bottom roller 1000A, 1000B can provide heat and/or pressure, which can generate the concave and convex portions 1010, 1015 in the bimorph 100E and/or can couple the first and second materials 110, 120.

The difference in coefficient of thermal expansion (CTE) is a term that can indicate a range of motion or deflection of a bimorph 100. With some materials the ACTE term can be 100-200 µm/m/K, which may not be desirable for some embodiments. Accordingly, various embodiments of a bimorph can comprise a highly twisted polymer coil actuator 1210 (e.g., FIGS. 12*a*, 12*b*, 13*a*, 13*b*, and the like), which in some embodiments can have an effective CTE value of 1000 μm/m/K or more. Such CTE values can find use in bimorph and bilayer structures having desirable deflection or bending characteristics. Any material with especially large CTE values might be useful in this manner, not just twisted polymer coil actuators.

In various embodiments, a coiled actuator 1210 can function as a thermally-responsive tensile actuator (linear motion) and/or a torsional actuator (rotational motion). In further embodiments, through the use of a complementary material, the structures described herein translate linear motion of a coiled actuator 1210 into motion in an orthogonal direction. Such embodiments can be desirable for use in thermally responsive yarns, fills, felts, fabrics, or the like, which can comprise garments and other articles that thicken upon exposure to low temperatures.

In various embodiments, it can be desirable to pair materials where difference between the CTE values of the two paired materials is large. Accordingly, coiled actuators 1210 having large CTE values can be desirable for use in bimorphs 100 and structures comprising bimorphs 100. In some embodiments, coiled actuators 1210 can have positive CTE characteristics (e.g., expanding with temperature increase, hetero-chiral coils where the twist and coil directions are opposite) or large negative CTE characteristics (e.g., contracting with a temperature increase, homo-chiral coils where the twist and coil directions are the same). In various embodiments, and as describe herein, pairing opposing coiled actuators 1210 together comprising the same filament material can generate a larger ACTE.

In various embodiments, bimorphs 100 can comprise twisted coil actuators 1220 where linear displacement of the actuator due to a temperature change can induce an out-of-plane or orthogonal deflection in the bimorph 100, leading to an effective change in height or thickness of the bimorph 100.

Figure 12A:
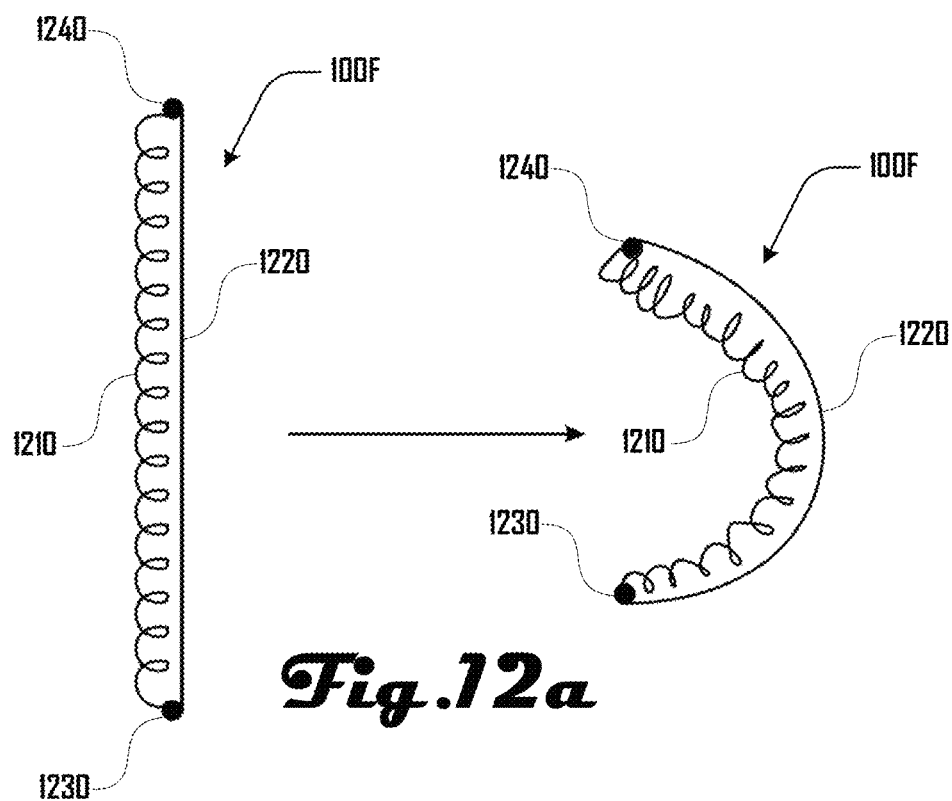
FIGS. 12a and 12b illustrate an example bimorph comprising a coiled actuator and a filament coupled at a first and second end.
Figure 12B:
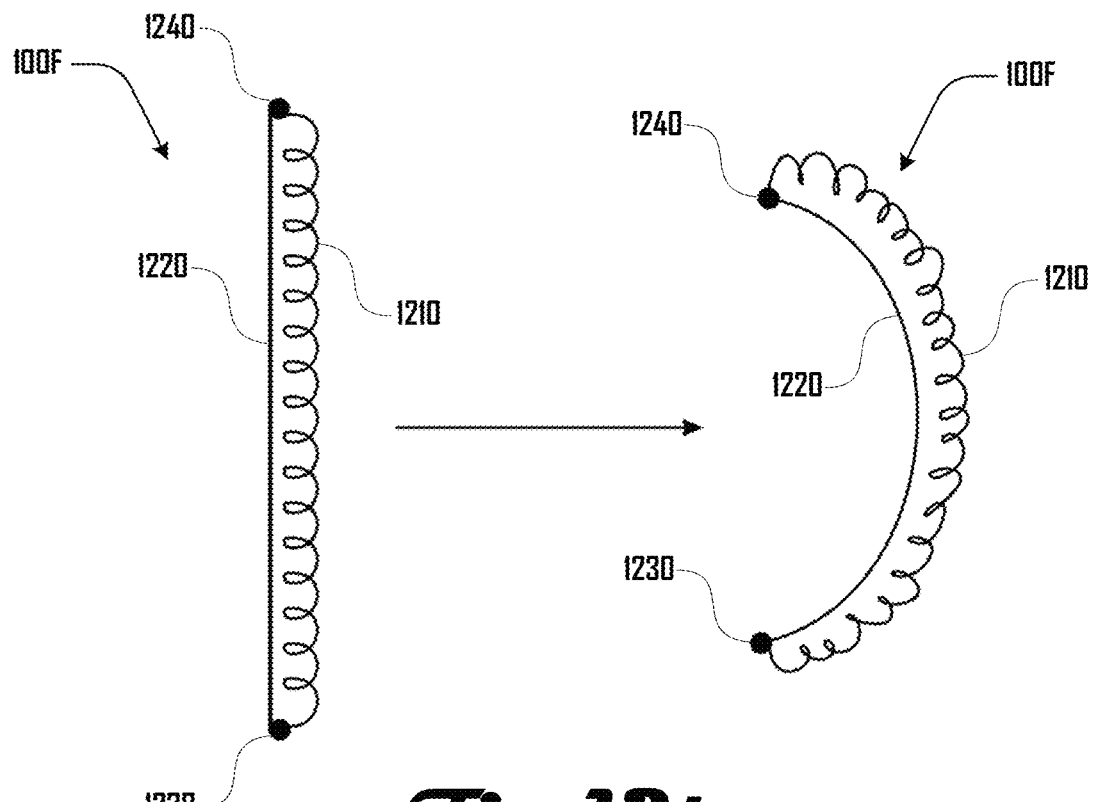

FIGS. 12*a* and 12*b* illustrate an example bimorph 100F comprising a coiled actuator 1210 and a filament 1220 coupled at a first and second end 1230, 1240. The coiled actuator 1210 and filament 1220 can be only coupled at the first and second end 1230, 1240 and/or can be coupled along a portion of their lengths.

In various embodiments the coiled actuator 1210 can expand or contract lengthwise in response to a temperature change. For example, the coiled actuator 1210 can contract on cooling (hetero-chiral fiber actuator, twist and coil directions are opposite) or expand on cooling (homo-chiral fiber actuator, twist and coil directions are the same). In various embodiments, the filament 1220 can expand, contract, or exhibit no substantial change lengthwise.

FIG. 12*a* illustrates the bimorph 100F in a flat configuration at a first temperature on the left and first contracted configuration on the right caused by a temperature change. FIG. 12*b* illustrates the bimorph 100F of FIG. 12*a* in a flat configuration at the first temperature on the left and second contracted configuration on the right caused by a temperature change opposite from the temperature change illustrated in FIG. 12*a*. For example, FIG. 12*a* can illustrate a change in configuration based on a negative temperature change and FIG. 12*b* can illustrate a change in configuration based on a positive temperature change.

In various embodiments, the coiled actuator 1210 and filament 1220 can be configured to both bend as shown in the example embodiment of FIGS. 12*a* and 12*b*, with the lengths of the coiled actuator 1210 and filament 1220 abutting in both bent and straight configurations. In further embodiments, the coiled actuator 1210 and filament 1220 can be configured to bend in different ways, and the coiled actuator 1210 and filament 1220 may not abut in flat and/or bent configurations.

Figure 13A:
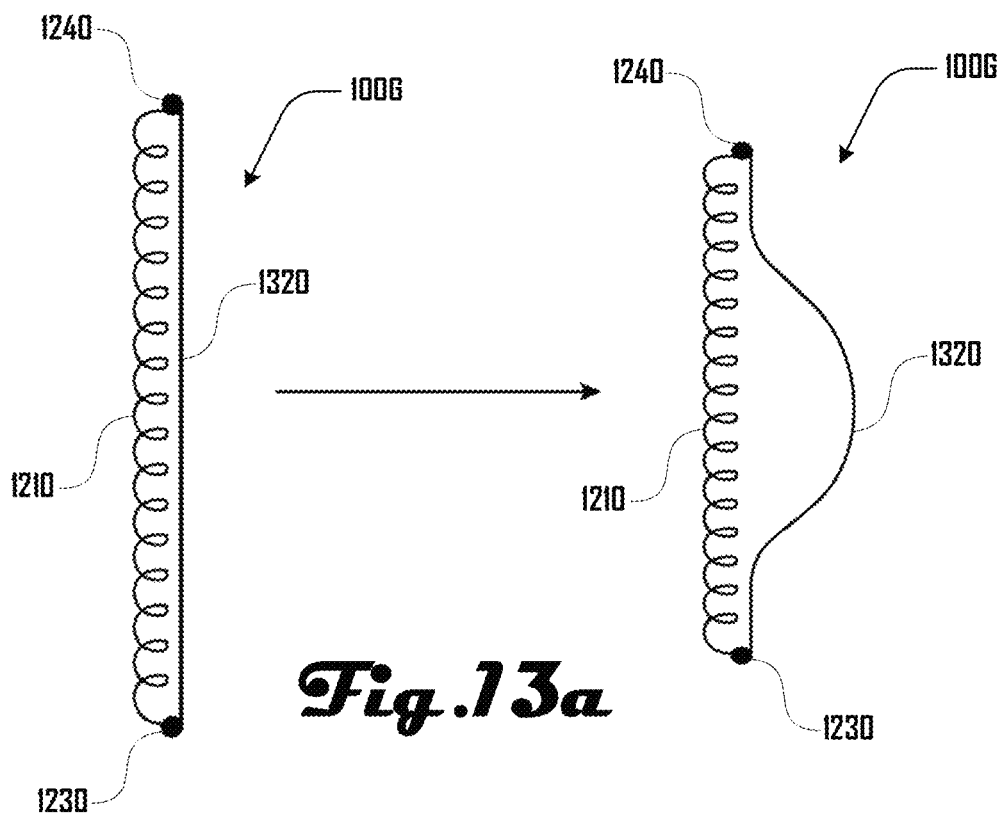
FIG. 13a illustrates an example embodiment of a bimorph having a coiled actuator and filament, wherein the coiled actuator maintains a linear configuration when the bimorph is in a flat configuration (left) and a bent configuration (right).

For example, FIG. 13*a* illustrates an example embodiment of a bimorph 100G having a coiled actuator 1210 and filament 1320, wherein the coiled actuator 1210 maintains a linear configuration when the bimorph 100 is in a flat configuration (left) and a bent configuration (right). In this example, the coiled actuator 1210 is shown contracting due to a temperature change, which causes the filament 1320 to bend away from the coiled actuator 1210.

Figure 13B:
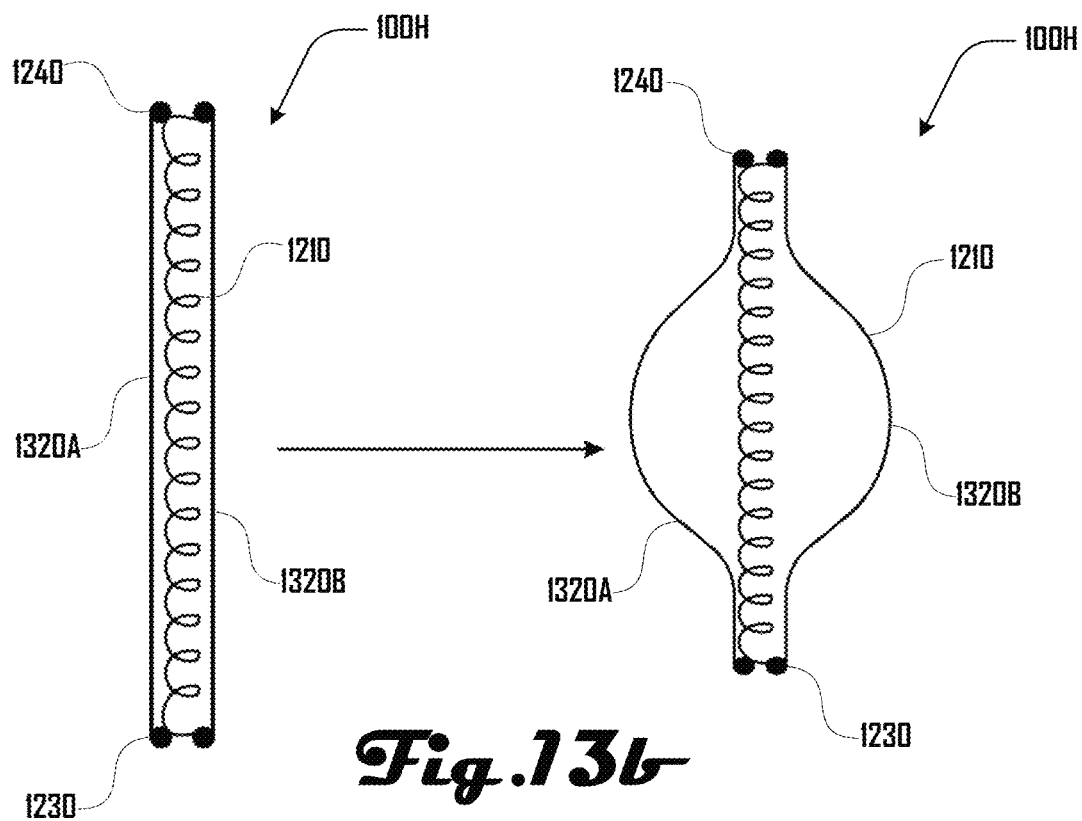
FIG. 13b illustrates a bimorph comprising a first and second filament with a coiled actuator between the first and second filament.

Similarly, FIG. 13*b* illustrates a bimorph 100H comprising a first and second filament 1320A, 1320B with a coiled actuator 1210 between the first and second filament 1320A, 1320B. In this example, the bimorph 100H is shown contracting due to a temperature change, which causes the filaments 1320A, 1320B to bend away from the coiled actuator 1210, which maintains a linear configuration.

Figure 14A:
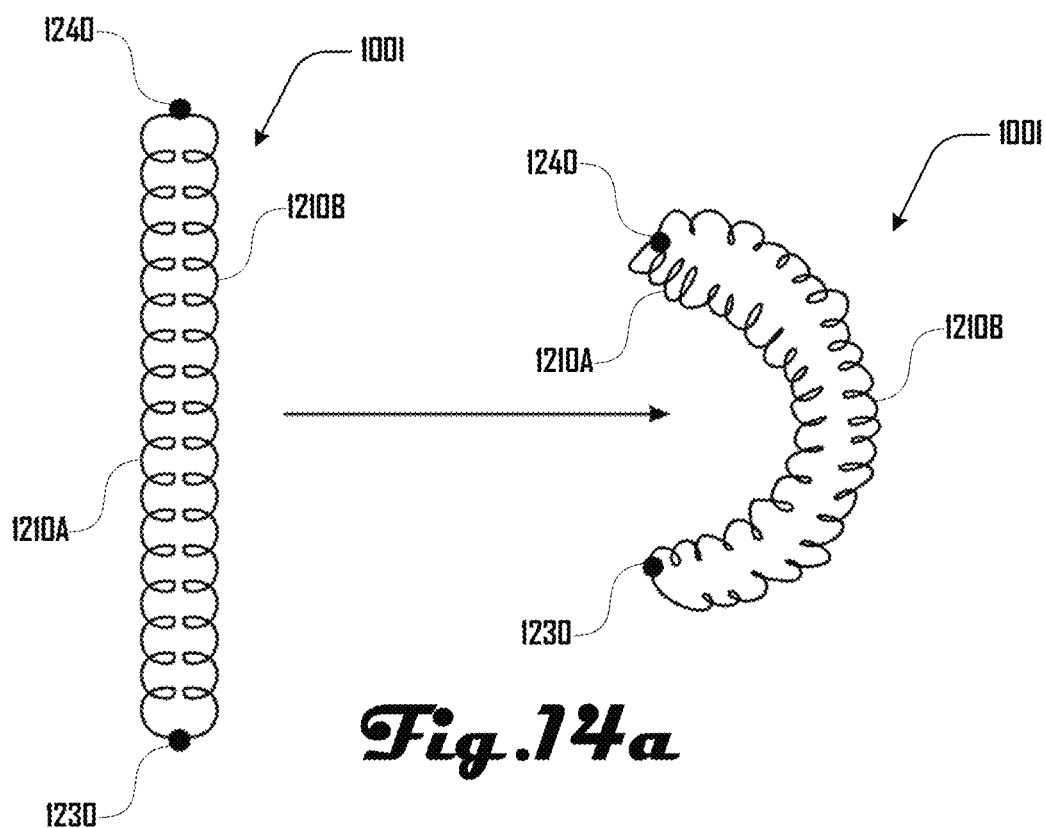
FIG. 14a illustrates an example embodiment wherein the coiled actuators have an opposing thermal response and remain adjoining in both a flat (left) and bent configuration (right).
Figure 14B:
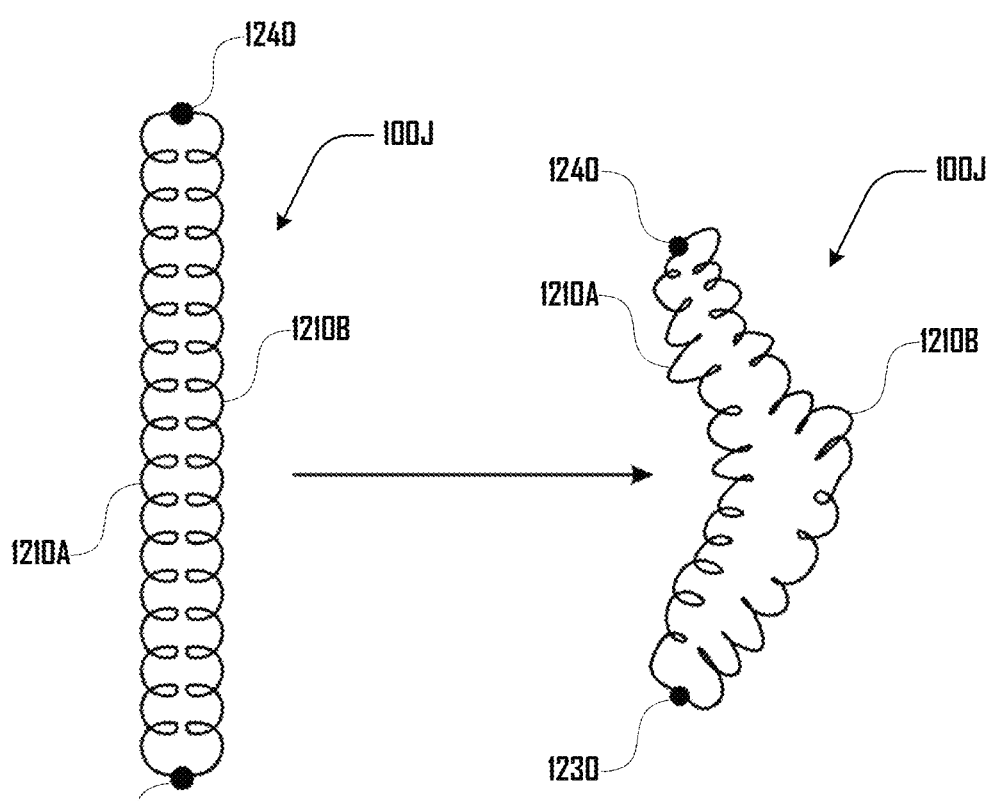
FIG. 14b illustrates an example embodiment wherein the coiled actuators are adjoining in a flat configuration (left) and can separate in a bent configuration (right).

FIGS. 14*a* and 14*b* illustrate example bimorphs 100I, 100J comprising a first and second coiled actuator 1210A, 1210B coupled at a first and second end 1230, 1240. In some embodiments, the coiled actuators 1210A, 1210B can be coupled along a portion of their length. FIG. 14*a* illustrates an example embodiment wherein the coiled actuators 1210A, 1210B have an opposing thermal response and remain adjoining in both a flat (left) and bent configuration (right). In contrast, FIG. 14*b* illustrates an example embodiment wherein the coiled actuators 1210A, 1210B are adjoining in a flat configuration (left) and can separate in a bent configuration (right).

Figure 15:
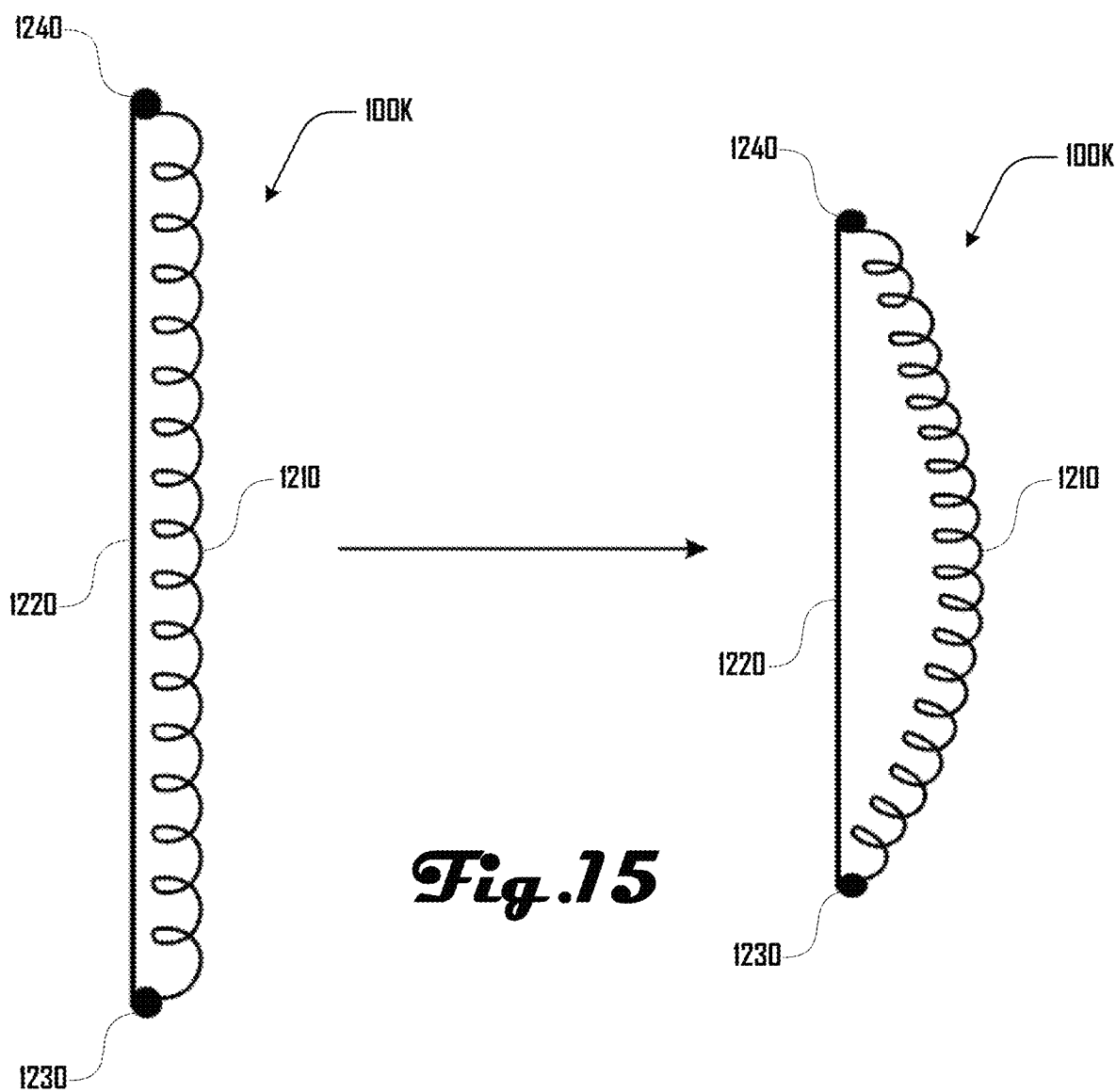
FIG. 15 illustrates an example embodiment of a bimorph having a coiled actuator and filament, wherein the filament maintains a linear configuration when the bimorph is in a flat configuration (left) and a bent configuration (right).

FIG. 15 illustrates an example embodiment of a bimorph 100K having a coiled actuator 1210 and filament 1220, wherein the filament 1220 maintains a linear configuration when the bimorph 100 is in a flat configuration (left) and a bent configuration (right). In this example, the coiled actuator 1210 is shown expanding due to a temperature change, which causes the coiled actuator 1210 to bend away from the filament 1220.

In various embodiments, one or more twisted coil actuator 1210 coupled with one or more rigid counter filament 1220 can act as an immobile structure against which an expanding coil 1210 can be displaced orthogonally, creating a structure with minimal linear expansion that still changes its effective thickness. FIG. 15 illustrates one example of such a structure.

In addition to desirable effective CTE values, coiled actuators 1210 can offer some processing or fabrication advantages, such as mechanical connection routes not available to sheet structures and the advantage of producing both positive and negative CTE coils from the same length of material as discussed herein. The effective CTE values of the coiled actuators 1210 can be maximized when the spring constant for the coiled actuators 1210 is large when the length of material is coiled around a mandrel, leaving an open space at the center of the coil. Coiled actuators 1210 can also be desirable due to porosity, density, and breathability, and the like, which can be present in such a structure.

Figure 16:
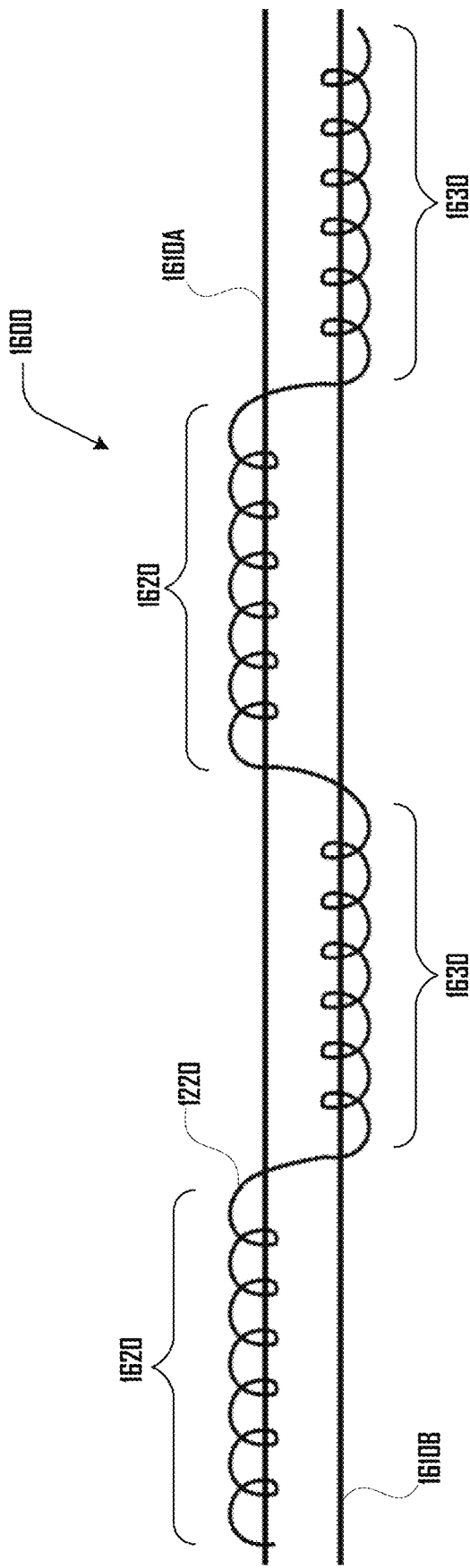
FIG. 16 illustrates a double mandrel structure for the production of a coiled actuator with alternating hetero-chiral and homo-chiral zones that can respond to temperature changes in opposite ways.

FIG. 16 illustrates a double mandrel structure 1600 for the production of a coiled actuator 1210 with alternating hetero-chiral and homo-chiral zones 1610, 1620 that can respond to temperature changes in opposite ways, which can generate a coiled actuator 1210 that has minimal linear distortion while retaining the capacity for lateral distortion and a change in effective thickness. The structure 1600 is shown comprising a first and second mandrel 1610A, 1610B with the coiled actuator 1210 coiling in opposite directions around each mandrel 1610A,1610B.1

Alternating hetero-chiral and homo-chiral zones within the same fiber actuator can also be produced by heavily twisting a fiber in its center while holding both ends under tension, producing sections of the fiber with opposite twists. By then coiling that fiber around a single mandrel the resulting coil will have both hetero-chiral and homo-chiral regions, leading to a length of material with alternating contracting and expanding segments.

In various embodiments, materials having large deflection and small linear distortion can be generated through alternating contracting and expanding segments within the same fibril within a yarn (or as a standalone element). For example, a coiled actuator 1600 as illustrated in FIG. 16 can be included in a fabric, yarn or other material. Alternatively, the use of staple fibers—some expanding, some contracting—can generate a material with small linear distortion.

In various embodiments, a coiled actuator 1210 can be woven or stitched through fabrics or thin films to create bimorph sheet structures, as described in greater detail herein, with large effective ACTE values and corresponding large deflections. In further embodiments, a coiled actuator 1210 can be stitched or bonded to sheets to create bimorph sheets. In some embodiments, a coiled actuator 1600 with alternating coil segments with alternating expanding and contracting segments of opposite chirality (e.g., as shown in FIG. 16) can be stitched or bonded to the surface of a sheet or fabric. Sheet structures can be formed where the sheet or ribbon takes on a sinusoidal profile as temperature changes due to the positive and negative thermally responsive zones within the alternating-chirality coiled actuator 1600. Embodiments of alternating-chirality coiled actuators 1600 can have applications in a variety of fields. For example, various embodiments can be configured for production of thermally adaptive garments, where alternating chirality coils can be used in a traditional lockstitch to create alternating positive and negative CTE regions on the surface of a fabric, inducing an undulation in the fabric as the temperature changes. In some embodiments, the second yarn or fiber in the lockstitch not need to be a large-CTE or twisted coil actuator material.

In some embodiments, a plurality of coiled actuators 1210 can be laid out side-by-side and woven or stitched together, creating a sheet or layer with a desirable CTE in a single direction. In still further embodiments, such sheets having different CTEs (e.g., one with a large positive CTE and one with a large negative CTE) can be paired to produce flat bimorph sheets with desirable differences in thermal expansion and a desirable radius of curvature.

In further embodiments, coiled actuators 1210 can be stitched onto a thin-film, membrane, or fabric, which can impart thermally responsive properties to such a thin-film, membrane, or fabric. Accordingly, various embodiments can remove the need for deeper integration of the selected materials with the insulation material or fabric. In such embodiments the thermally responsive material can additionally be part of the weave, it can be the primary body of the insulation, it can be the substrate, or it can be adhered to another material through an adhesive or thermal bond.

In a further embodiment, net-zero CTE materials can be constructed from such alternating-chirality coiled actuators 1600, where the sum of the positive and negative CTE zones add to create zero overall change.

Additionally, coiled actuators 1210 can be used to generate branched structures similar to those in goose down. For example, in some embodiments, by dragging a twisted fiber through a layer of thin fibers during a coiling process, the thin fibers can be captured or caught in the coils, forming a branched structure with favorable insulating, tactile, and structural properties, in the larger context of a variable insulation.

A coiled actuator 1210 can serve as a linear or torsional actuator. In various embodiments, as discussed herein, pairing two different materials can generate out-of-plane or orthogonal motion. In some embodiments, woven or knit structures that antagonistically pair twisted coils with different CTE characteristics can comprise a thermally responsive bimorph 100. In some embodiments, a plurality of materials can be woven together in various suitable ways to generate a gross physical structure of the weave that changes in response to temperature. Such a woven structure can comprise, coiled actuators 1210, or other suitable materials or structure that is changes configuration or length in response to temperature.

In various embodiments, a woven or knit structure can serve as a constraint by aligning fibers so that the overall motion is cohesive and not characterized by the random individual squirm of a disparate group of fibers, which can be desirable for a thermally adaptive material and maximizing its deflection or change in its effective thickness.

In further embodiments, temperature sensitive structures can include non-adaptive constraints such as a fiber, yarn, or fabric that the active material works against, where the non-adaptive material stays linear, straight, or flat, and the active material lofts due to expansion, or where the active material stays linear, straight, or flat and the non-adaptive material lofts due to the active material's contraction. Appropriate constraints through weaving, knitting or the use of adhesives can generate a desired temperature response in such structures. In some embodiments it can be advantageous to employ a constraint that limits the range of motion of the material.

Additionally, as discussed herein, materials used to generate bimorphs 100 can be responsive to one or more suitable environmental condition, including humidity and/or exposure to liquids (e.g., saturation by liquids). For example, in some embodiments it can be desirable for adaptive insulation in a garment to respond to both temperature changes and moisture changes (e.g., based on humidity and/or sweat of a user). Accordingly, the use of moisture-sensitive polymers and other suitable materials in various bimorph structures can be configured to be both temperature and moisture responsive. Such materials might be primarily responsive to moisture or chemical stimulus.

Figure 17:
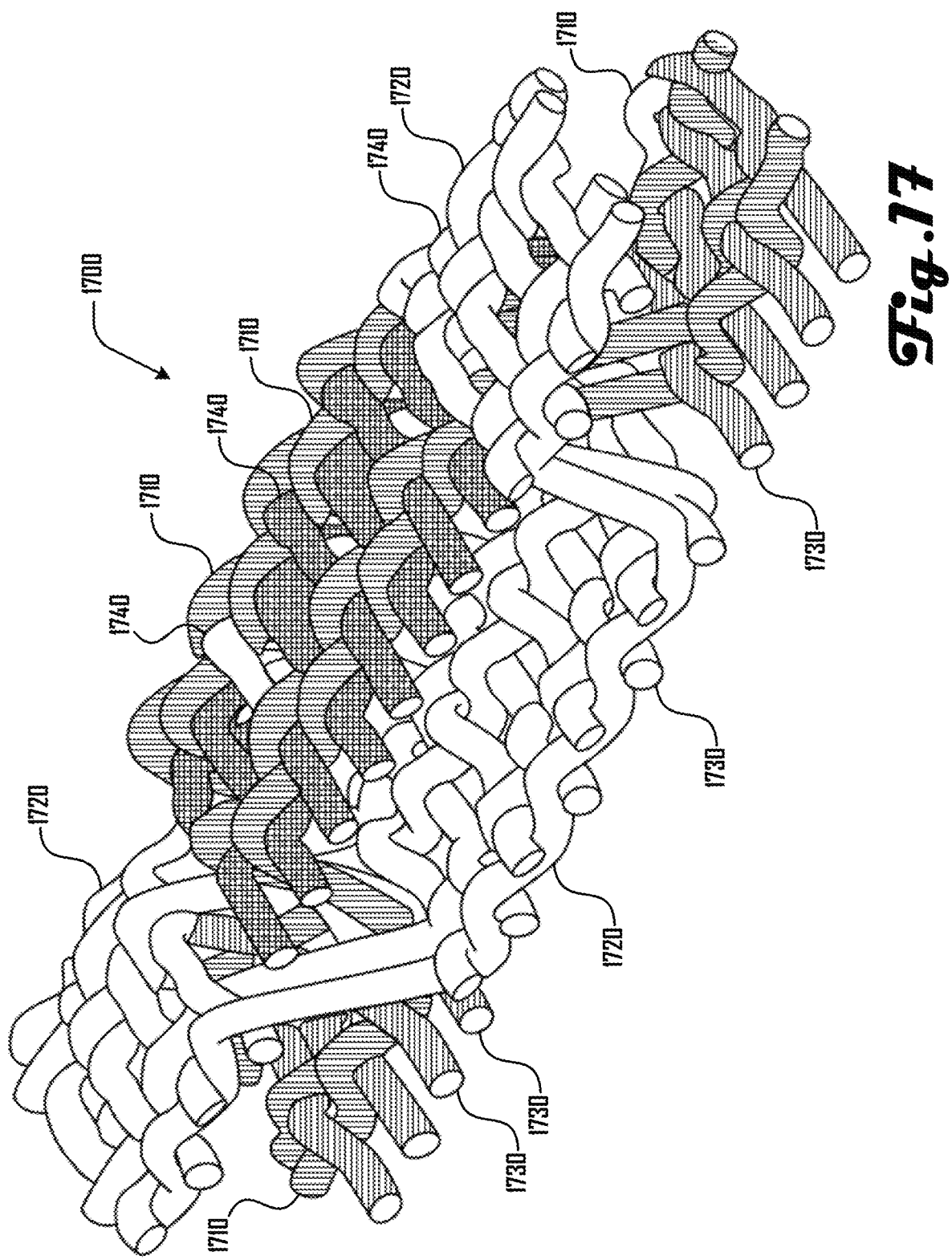
FIG. 17 illustrates one example embodiment of a thermally adaptive woven structure.

FIG. 17 illustrates one example embodiment of a thermally adaptive woven structure 1700. In this example the structure 1700 can be configured to constrain fibers with different thermal expansion characteristics to create a thermally responsive textile where the geometric change is not in the plane of the fabric, but is instead perpendicular to that, effectively changing the thickness of the fabric.

The structure 1700 is shown comprising a first and second fiber 1710, 1720, which can have different thermal expansion coefficients. More specifically, first fibers 1710 can have a different thermal expansion coefficient relative to the parallel running second fibers 1720, which can generate an alternating bimorph structure. Upper and lower cross fibers (or yarns) 1730, 1740 help to hold the shape of the structure 1700 and/or confine the first and second fibers 1710, 1720. The cross fibers 1730, 1740 may or may not change shape or length in response to temperature changes in accordance with some embodiments. In various embodiments, the structure 1700 behaves as an alternating bimorph structure such as in FIGS. 2 and 3 and can assume an undulating structure (e.g. like a corrugated sheet) as temperature changes induce different expansions or contractions along the lengths of the parallel and opposing first and second fibers 1710, 1720. The fibers running across need not have any special thermal characteristics, but are important for their roles in confining the parallel and opposite fibers that are primarily responsible for the overall geometric distortion in response to external stimulus.

FIGS. 18*a* and 18*b* illustrate a thermally responsive woven structure 1800 in a pouch or quilting showing lofting in response to an increase in temperature. FIG. 18*a* illustrates the structure at about 25° C. and FIG. 18*b* illustrates the structure at about 65° C. In this example, heating generates lofting of the structure 1800, however, in further embodiments, as discussed herein, a structure 1800 can be configured to loft in response to a decrease in temperature.

FIGS. 19*a* and 19*b* illustrate a thermally responsive woven structure showing lofting in response to a decrease in temperature. FIG. 19*a* illustrates the textile structure substantially flat at 30° C. and FIG. 19*b* illustrates the lofted structure at 7° C.

Embodiments of woven or knit structures described herein can be advantageous, because they can take advantage of existing infrastructure and production methods. Further embodiments can desirably avoid the use of adhesives and/or thermal bonding, techniques that can add weight, induce physical distortion, or change the properties of the materials of some embodiments. Additionally, embodiments of woven or knit structures discussed herein can also allow for the introduction of additional partnering fibers that can offer advantages to the adaptive textile, such as fibers for wicking for moisture management, fibers for abrasion resistance, fibers for touch or feel, and the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A thermally adaptive woven or knit fabric that comprises:
    a plurality of first fibers having a first coefficient of thermal expansion,
    a plurality of second fibers having a second coefficient of thermal expansion,
        wherein there is a difference between the first coefficient of thermal expansion of the first fibers and the second coefficient of thermal expansion of the second fibers;
        wherein one or both of the plurality of first fibers and plurality of second fibers are twisted coil actuators; and
    an alternating fabric structure with a first and second opposing side of a plane that comprises:
        a set of the plurality of first fibers woven in parallel and alternating between extending along external faces of the first and second opposing sides;
        a set of the plurality of second fibers woven in parallel to each other and in parallel to the set of the plurality of first fibers, the set of the plurality of second fibers woven alternating between extending along the external faces of the first and second opposing sides and opposing the set of the plurality of first fibers;
        upper and lower cross fibers respectively on the first and second opposing sides, the upper and lower cross fibers holding the shape of the alternating fabric structure and confining the first and second fibers;
        a plurality of alternating adjoining first and second portions extending contiguously along the plane of the alternating fabric structure;
        the first portions defined by a pair of opposing first and second materials with the first material on the first side and the second material on the second side, the first material comprising a length of the set of the plurality of first fibers and a length of the second material comprising a set of the plurality of second fibers;
        the second portions defined by a pair of opposing first and second materials with the second material on the first side and the first material on the second side;
        the plurality of first materials defining a respective first length at a first temperature;
        the plurality of second materials defining a respective second length at the first temperature;
        wherein at a second temperature, thermal expansion or contraction of the first material along the direction of the first length differs from an amount of thermal expansion or contraction of the second material along the direction of the second length, causing the first and second portions to bend; and
        wherein the bending of the first and second portions of the fabric change the effective thickness of the thermally adaptive woven or knit fabric.

2. The thermally adaptive woven or knit fabric of claim 1 wherein the magnitude of the coefficient of thermal expansion of the twisted coil actuators is 1000 μm/m/K or more.

3. The thermally adaptive woven or knit fabric of claim 1 wherein the effective thickness of the fabric at least doubles from the change from the first temperature to the second temperature, wherein the difference between the first temperature and the second temperature is 10° C. or less.

4. A thermally adaptive woven or knit fabric that comprises:
    a plurality of first fibers having a first coefficient of thermal expansion,
    a plurality of second fibers having a second coefficient of thermal expansion,
        wherein there is a difference between the first coefficient of thermal expansion of the first fibers and the second coefficient of thermal expansion of the second fibers;
        wherein one or both of the plurality of first fibers and plurality of second fibers are twisted coil actuators; and
    an alternating fabric structure with a first and second opposing side of a plane that comprises:
        the first portions defined by a pair of opposing first and second materials with the first material on the first side and the second material on the second side, the first material comprising a set of the plurality of first fibers and the second material comprising a set of the plurality of second fibers;
        the second portions defined by a pair of opposing first and second materials with the second material on the first side and the first material on the second side;
        the plurality of first materials defining a respective first length at a first temperature;

the plurality of second materials defining a respective second length at the first temperature;

wherein at a second temperature, thermal expansion or contraction of the first material along the direction of the first length differs from an amount of thermal expansion or contraction of the second material along the direction of the second length, causing the first and second portions to bend; and wherein the bending of the first and second portions of the fabric change the effective thickness of the thermally adaptive woven or knit fabric.

5. The thermally adaptive woven or knit fabric of claim 4, wherein the set of the plurality of first fibers are parallel to each other and alternate between extending along external faces of the first and second opposing sides.

6. The thermally adaptive woven or knit fabric of claim 4, wherein the set of the plurality of first fibers are parallel to each other and alternate between external faces of the first and second opposing sides.

7. The thermally adaptive woven or knit fabric of claim 6, wherein the set of the plurality of second fibers are parallel to each other and parallel to the set of the plurality of first fibers, the set of the plurality of second fibers alternating between extending along the external faces of the first and second opposing sides and opposing the set of the plurality of first fibers.

8. The thermally adaptive woven or knit fabric of claim 4 wherein the magnitude of the coefficient of thermal expansion of the twisted coil actuators is 1000 μm/m/K or more.

9. The thermally adaptive woven or knit fabric of claim 4 wherein the effective thickness of the fabric at least doubles from the change from the first temperature to the second temperature.

10. The thermally adaptive woven or knit fabric of claim 9 wherein the difference between the first temperature and the second temperature is 10° C. or less.

11. The thermally adaptive woven or knit fabric of claim 4 wherein the thermally adaptive woven or knit fabric undergoes a change in area no more than 5% when the difference between the first temperature and the second temperature is 10° C. or less.

12. The thermally adaptive woven or knit fabric of claim 4 wherein both the plurality of the first fibers and the plurality of the second fibers comprise twisted coil actuators.

13. The multilayer adaptive woven or knit fabric of claim 4 comprising two adaptive woven or knit fabric layers and each layer independently has a different bending response to temperature.

14. An adaptive textile that comprises:
a plurality of a first fiber having a first expansion coefficient,
a plurality of a second fiber having a second expansion coefficient,
wherein there is a difference between the first expansion coefficient of the first fiber and the second expansion coefficient of the second fiber;
wherein at least one of the first or second fibers is a twisted coil actuator; and
wherein linear displacement of the twisted coil actuator causes the adaptive textile to bend; and
a plurality of first and second portions along a plane of the adaptive textile,
wherein the first portions are defined by a first pair of opposing first and second materials with the first material on a first side and the second material on a second side;
wherein the second portions defined by a second pair of opposing first and second materials with the second material on the first side and the first material on the second side;
wherein the plurality of first materials define a respective first length at a first temperature;
wherein the plurality of second materials define a respective second length at the first temperature; and
wherein at a second temperature, thermal expansion or contraction of the first material along the direction of the first length differs from an amount of thermal expansion or contraction of the second material along the direction of the second length, causing the first and second portions to bend.

15. The adaptive textile of claim 14, wherein the set of the plurality of first fibers are disposed in parallel and alternating between extending along external faces of first and second opposing sides of the adaptive textile.

16. The adaptive textile of claim 15 wherein the set of the plurality of second fibers are disposed in parallel to each other and in parallel to the set of the plurality of first fibers, the set of the plurality of second fibers woven alternating between extending along the external faces of the first and second opposing sides and opposing the set of the plurality of first fibers.

17. The adaptive textile of claim 14, further comprising a plurality of alternating first and second portions along a plane of the adaptive textile,
wherein the first portions are defined by a pair of opposing first and second materials with the first material on the first side and the second material on the second side, the first material comprising a length of the set of the plurality of first fibers and a length of the second material comprising a set of the plurality of second fibers; and
wherein the second portions defined by a pair of opposing first and second materials with the second material on the first side and the first material on the second side.

18. The adaptive textile of claim 14 wherein the effective thickness of the adaptive textile at least doubles.

19. The adaptive textile of claim 14 wherein the bending response of the adaptive textile is continuous.

20. An adaptive garment comprising the adaptive textile of claim 14.

* * * * *